(12) United States Patent
Nakamura

(10) Patent No.: US 8,305,635 B2
(45) Date of Patent: Nov. 6, 2012

(54) IMAGE FORMING APPARATUS, IMAGE FORMING METHOD, AND COMPUTER-READABLE STORAGE MEDIUM

(75) Inventor: Yasuyuki Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 476 days.

(21) Appl. No.: 12/336,776

(22) Filed: Dec. 17, 2008

(65) Prior Publication Data

US 2009/0161133 A1    Jun. 25, 2009

(30) Foreign Application Priority Data

Dec. 21, 2007  (JP) ................. 2007-330963

(51) Int. Cl.
*H04N 1/60* (2006.01)

(52) U.S. Cl. ....... 358/1.9; 358/3.26; 358/3.27; 358/504; 358/518; 347/19

(58) Field of Classification Search ................. 358/1.9, 358/3.26–3.27, 504, 518; 347/19
See application file for complete search history.

(56) References Cited

U.S. PATENT DOCUMENTS

| | | | | |
|---|---|---|---|---|
| 5,357,315 | A * | 10/1994 | Suzuki | 355/77 |
| 5,649,073 | A * | 7/1997 | Knox et al. | 358/1.9 |
| 5,777,656 | A * | 7/1998 | Henderson | 347/251 |
| 6,366,306 | B1 * | 4/2002 | Fukuda | 347/172 |
| 6,704,123 | B1 * | 3/2004 | Av-Shalom et al. | 358/2.99 |
| 6,906,828 | B2 * | 6/2005 | VanDuyn et al. | 358/2.1 |
| 6,963,424 | B1 * | 11/2005 | Higuchi | 358/1.9 |
| 6,965,462 | B1 * | 11/2005 | Henderson et al. | 358/504 |
| 6,999,199 | B2 * | 2/2006 | Degani et al. | 358/1.9 |
| 7,142,332 | B2 * | 11/2006 | Degani et al. | 358/3.1 |
| 7,239,820 | B2 * | 7/2007 | Donaldson | 399/49 |
| 2005/0105112 | A1 * | 5/2005 | Fukuda | 358/1.9 |

FOREIGN PATENT DOCUMENTS

| | | |
|---|---|---|
| JP | 11-164148 | 6/1999 |
| JP | 11-177822 | 7/1999 |
| JP | 2001-334703 A | 12/2001 |
| JP | 2004-142163 | 5/2004 |
| JP | 2006-030422 A | 2/2006 |

* cited by examiner

*Primary Examiner* — Richard Zhu

(74) *Attorney, Agent, or Firm* — Canon U.S.A., Inc. IP Division

(57) ABSTRACT

A method that prints image data including multiple pages one copy at a time, and prints multiple copies, includes generating a patch image having multiple densities, forming the patch image on a photosensitive drum, and reading the density of the patch image, wherein generating the patch image, forming the patch image, and reading the density of the patch image are performed at a time of ending printing for certain copies.

7 Claims, 17 Drawing Sheets

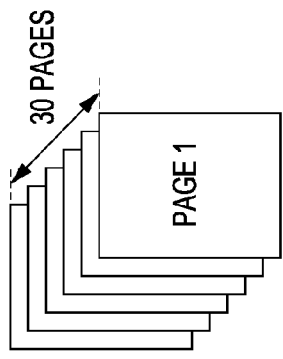
FIG. 2A
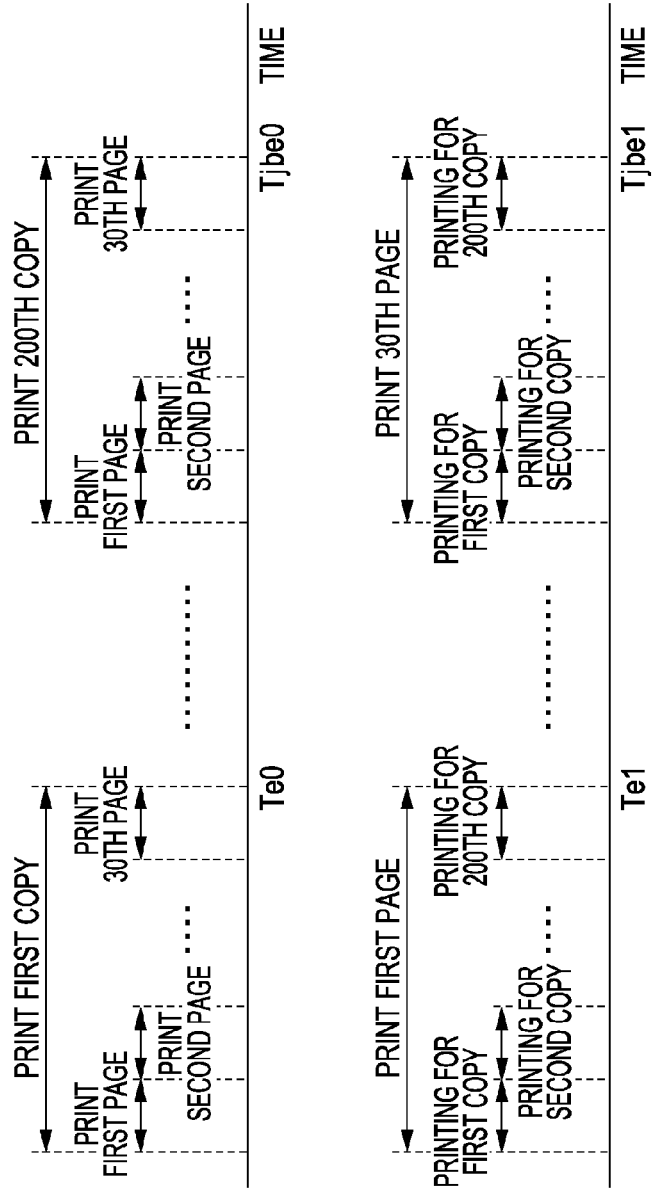
FIG. 2B
FIG. 2C

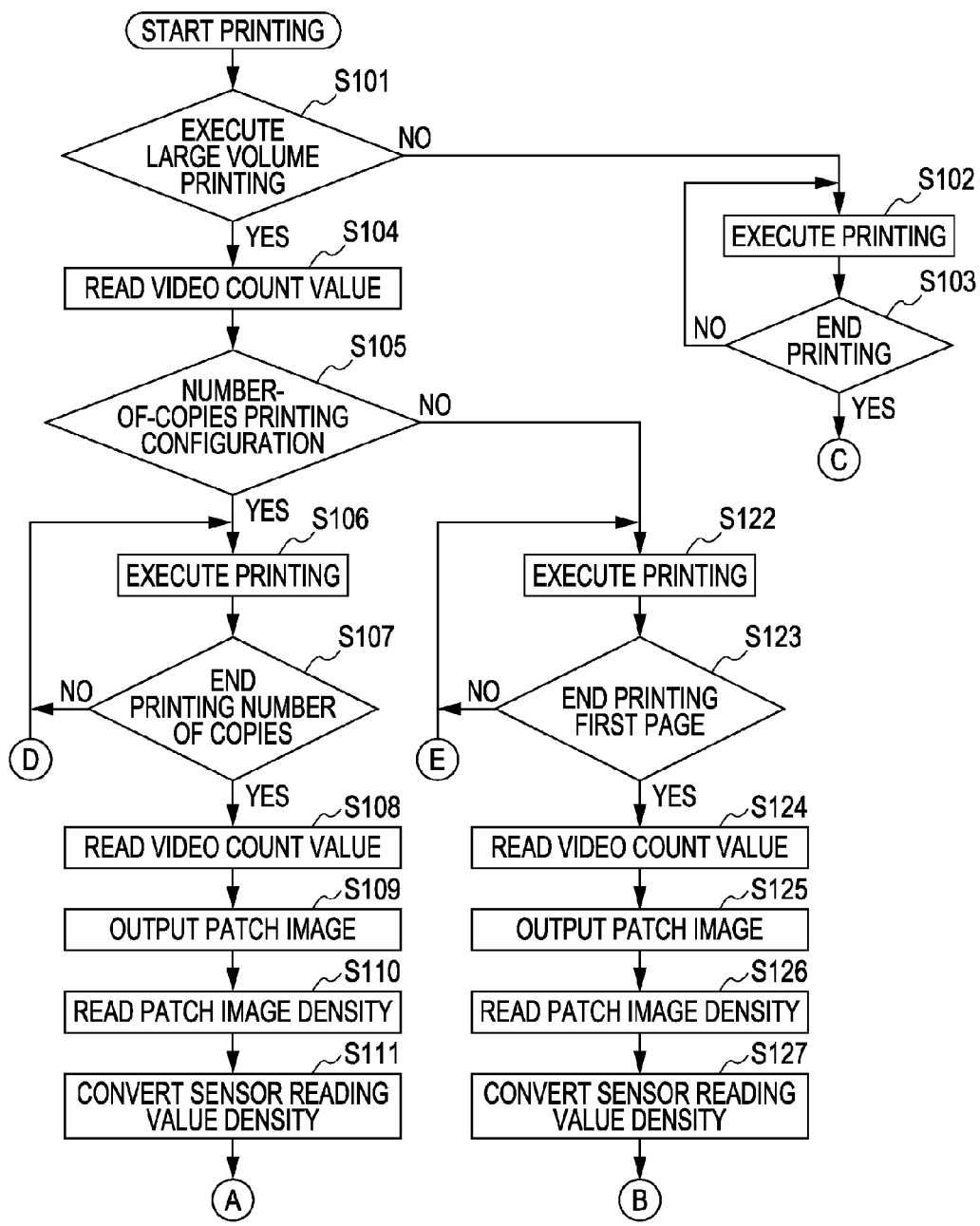

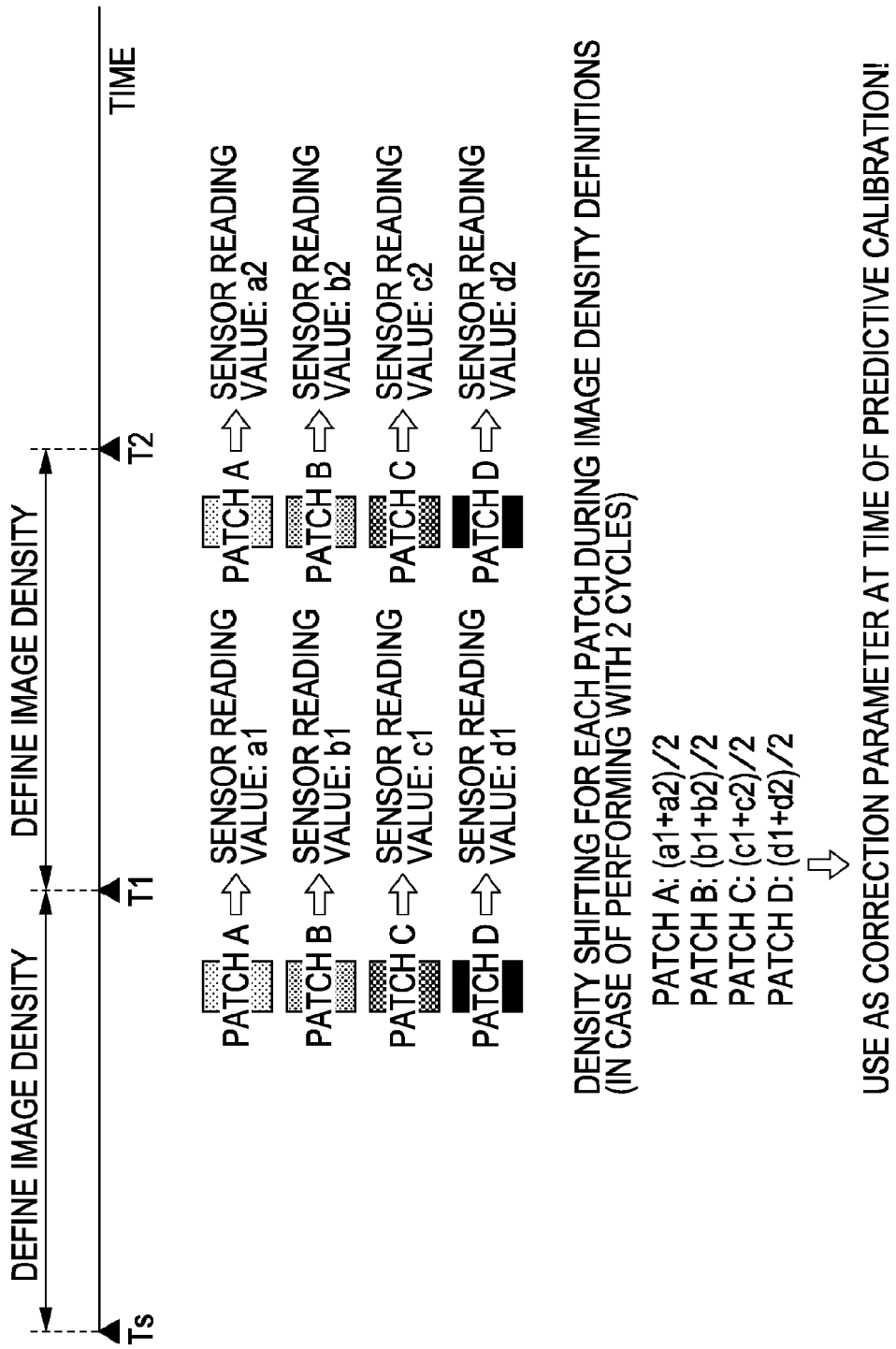

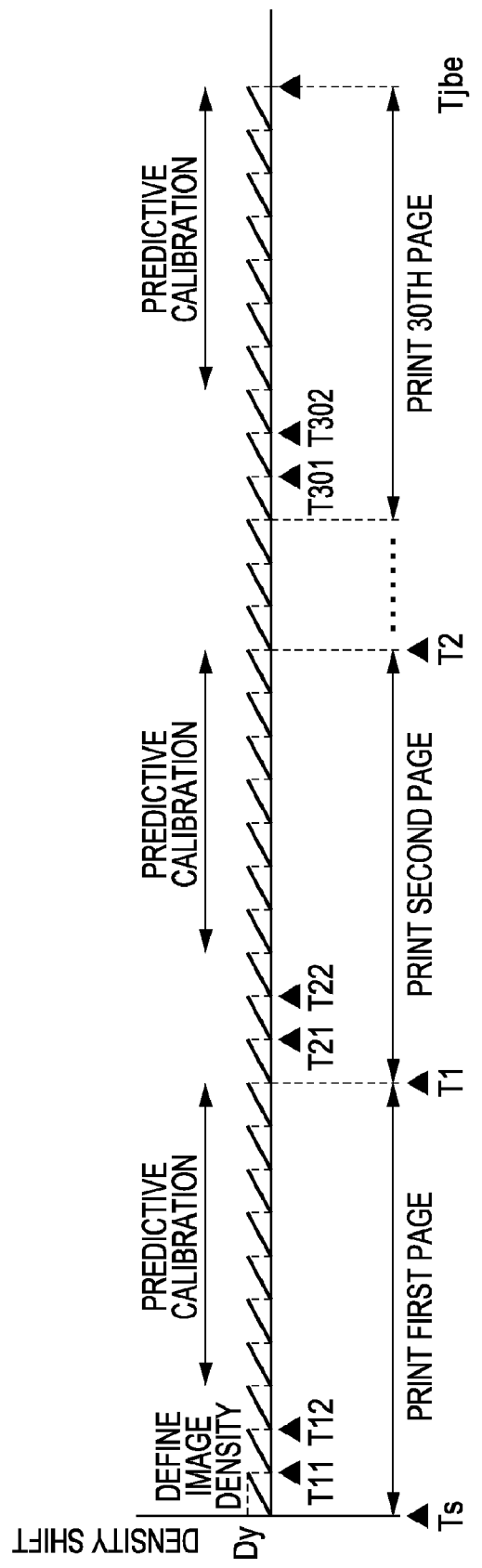

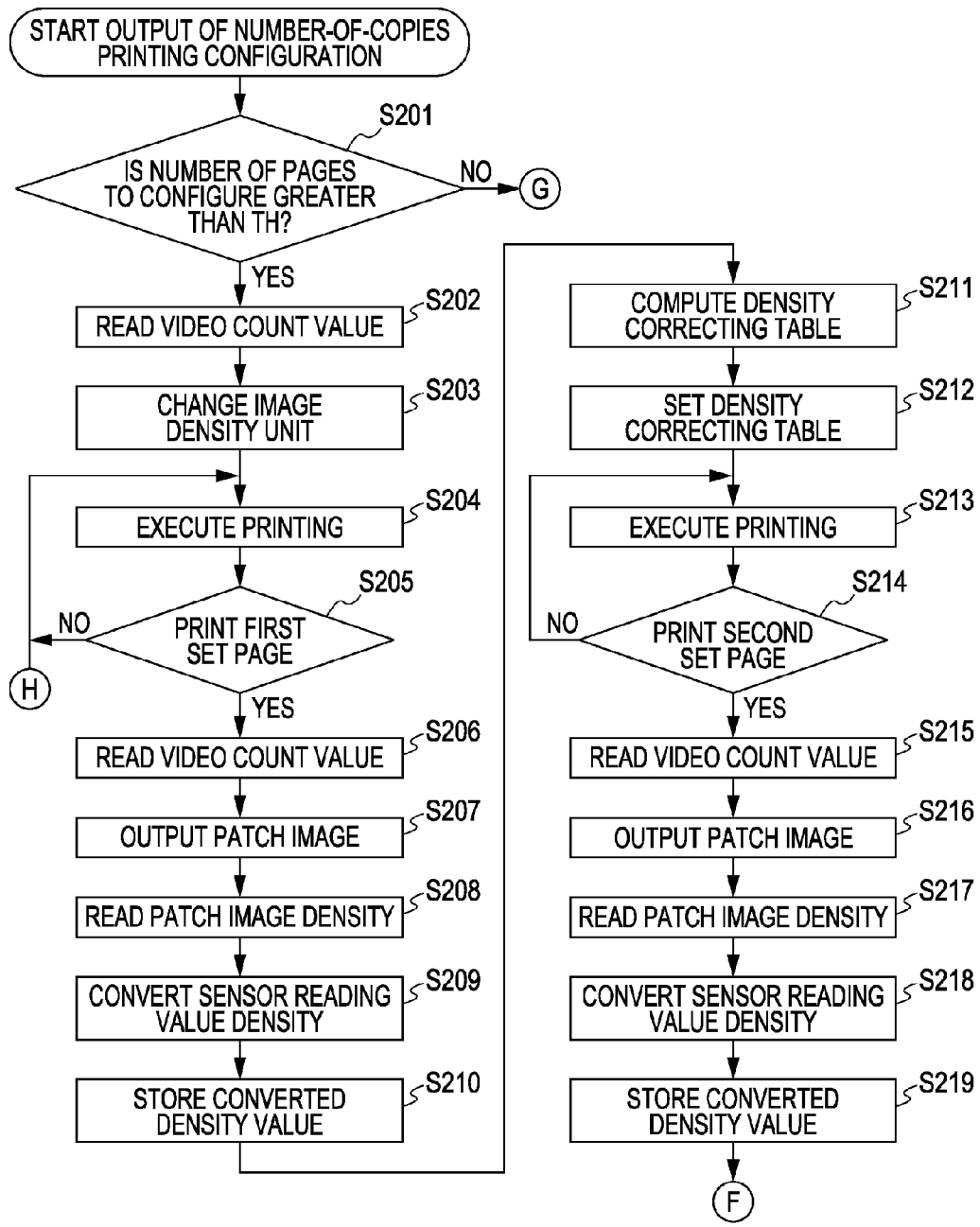

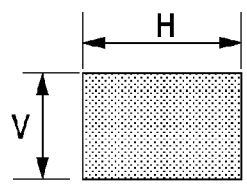 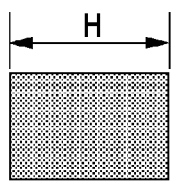 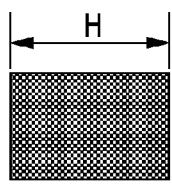 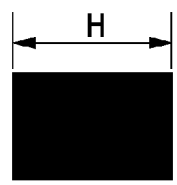
FIG. 12A PRIOR ART  FIG. 12B PRIOR ART  FIG. 12C PRIOR ART  FIG. 12D PRIOR ART
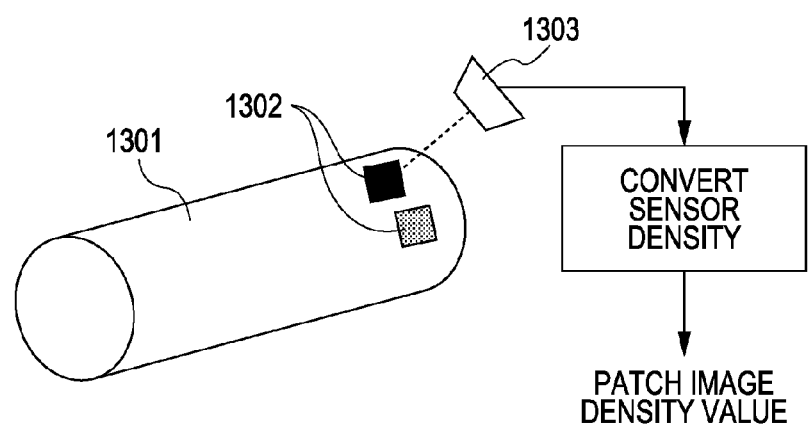
FIG. 13 PRIOR ART

IMAGE FORMING APPARATUS, IMAGE FORMING METHOD, AND COMPUTER-READABLE STORAGE MEDIUM

BACKGROUND OF THE INVENTION

1. Field of the Invention

The present invention relates to an image forming apparatus, image forming method, and a computer-readable storage medium in order to stabilize output features of an output apparatus.

2. Description of the Related Art

In recent years, print-on-demand (hereafter called POD) using a high-speed multi-function device has become common for printing work and copying work. POD efforts have advanced in general industries in order to self-manufacture meeting materials or proposals, and in design offices in order to perform prepress or printing of color comprehensive layout. Workflow of digital printing has permeated, with these industries centrally, and the usability and economy has becomes widely understood, and a market called "digital business printing" has been formed. Printing apparatuses applicable to this market not only outputs high quality printed material, but are printing apparatuses securing high production.

An electrophotography method is an image recording method used with an image forming apparatus such as a photocopier. Electrophotography is a method which forms a latent image on a photosensitive drum using a laser beam, and develops this with a charged color material (hereafter called toner). Image recording is performed by transferring an image exposed with the toner to a transfer sheet and fusing thereupon.

Nowadays, the electrophotography method is not only employed as printing apparatuses for complex machines in offices, but has also come to be employed as to printing apparatuses to create quality printed materials and so forth in the "digital business printing" market.

With the electrophotography method, calibration processing is a process performed in order to keep the output image at a predetermined density quality. Calibration processing is processing performed in order to reduce the density of a printed image due to shift in output density or changes in coloring at the printing apparatus, owing to change over time. A general calibration processing operation of the electrophotography method will be described with reference to the drawings.

FIG. 11A is an operation flow diagram to describe a calibration operation. FIG. 11B is a diagram showing calibration performing timing. As shown in FIG. 11B, the calibration operation with the electrophotography method is generally executed with a flag input timing from the printer engine employing the electrophotography method or a interrupt signal timing (T1, T2, T3) as to a control system. In many cases, the flag, or the timing that the interrupt signal is output, is at the point-in-time that printing of a predetermined number of sheets has been performed. For example, in the case that the printing apparatus is such that performing density correction of the output image is better at the point-in-time that the number of sheets printed has reached 500 sheets, a flag, or an interrupt signal, is generated from the output engine each time printing of 500 sheets has ended.

Next, the execution flow for calibration will be described with reference to FIG. 11A. Upon a predetermined number of sheets being printed, the output engine outputs a flag/interrupt signal as to a printing apparatus control side (hereafter called controller) (step S401). Upon receiving the flag/interrupt signal, the controller instructs the output engine to output patch image data which the engine has (step S402). A patch image is image data of a predetermined size and predetermined density defined for each engine, and is generally defined as image data indicating multiple densities. FIGS. 12A through 12D show an example showing configuration of a patch image with a black-and-white output engine, wherein the patch image with four density types is defined as primary scanning direction: H pixels, secondary scanning direction: V pixels. Note that with patch images defined with a color output engine, there is a patch image for each component making up the color image. As a representative example, for each of the components of cyan (hereafter, C), magenta (hereafter, M), yellow (hereafter, Y), and black (hereafter K), there are multiple patch images with predetermined densities.

At the time of calibration operation, the patch image is image-formed at a predetermined position on the photosensitive drum. FIG. 13 is an example in the case that a patch image is formed as to the photosensitive drum. Unlike the time of normal printing, the patch image 1302 formed on the photosensitive drum 1301 is not transferred to a transfer sheet, and the density value thereof is read by a sensor 1303 shown in FIG. 13 (step S403). If the density value read by the sensor 1303 is the density value shown by the original patch image, there is no problem in particular, but with an electrophotography method, a density feature at the point-in-time that the printing of the predetermined number of sheets has ended generates density shifting. For example, there are cases wherein the read density value of the patch image with density: 64 greatly overruns or falls below 64. The width of the density shift differs depending on environmental effects such as temperature and humidity inside and outside of the printing apparatus, and how much toner is consumed to print the predetermined number of sheets. That is to say, the density shift width of the patch image differs with the case where image data that is close to a solid is printed on white sheets the predetermined number of sheets, and the case where image data that has a relatively high ratio of white portion is printed on the predetermined number of sheets.

The calibration with the electrophotography method is to correct such density shifting, and is based on creating a correcting table to correct the density shift based on the density values read by the sensor 1303 (step S404).

The concept of creating the correcting table is shown in FIGS. 14A through 14C. FIGS. 14A through 14C take the density level of the patch image as the horizontal axis and the output density level read with the sensor 1303 of the patch image image-formed on the photosensitive drum as the vertical axis. The gridlines of the density level which is the horizontal level shows the density level of the patch image, and with the present description, indicates that there are four patch image densities which are 64, 128, 192, and 255. Also, the four points of Pa, Pb, Pc, and Pd indicate values wherein the reading values of the sensor 1303 in the event of image-forming the patch image on the photosensitive drum as a density reduced value.

In the case of an ideal density feature, the patch image density and the reading density by the sensor 1303 are the same value, and thereby are in a linear density relation as shown by W1. However, in many cases, the density feature after printing a predetermined number of sheets becomes as shown in Pa through Pd in FIG. 14A, and are not plotted on W1, but have output density values with shifts for each of the patch images. With the example in FIG. 14A, each patch image has a higher output density level value than the original density value on the W1. In other words, even with the same image data, the output density after printing the predetermined number of sheets which is the calibration processing timing becomes higher than the image data density at the time of printing starting. Note that the density levels other than the patch image density level, e.g. output density levels corresponding to density levels such as density levels 65 through 127, or 129 through 191, often have performed correcting processing using a measurement output density level near the density level value thereof. That is to say, an output density level equivalent to the density levels of density levels 65 through 127 perform correcting processing using the values of Pa and Pb. A method for correcting processing may be a one-dimensional linear correcting processing, or may be an interpolating processing using a quadratic term. With such interpolating processing, correlation of the density level after the predetermined number of sheets and the output density level come to have the features shown by W2.

Receiving this result, the controller of the printing apparatus creates an inverse converting table W3 such that the output density feature which becomes W2 after printing of the predetermined number of sheets becomes the output density feature of W1. Employing the density feature table of W3 to correct the image data input in the printing apparatus, a linear density image shown in FIG. 14B, i.e. the output image on W1 is obtained.

However, at the point-in-time that the inverse converting table W3 is set, even if the density feature becomes the output feature of the linear density W1, in the case that further printing is performed for a predetermined number of sheets thereafter, density shifting occurs again (FIG. 14C).

FIG. 15 shows the degree of density shifting of the output image data and passage of time in the case that time is shown on the horizontal axis and the output density level is shown on the vertical axis. In FIG. 15, Ps shows the state immediately following calibration, and Pe shows the state wherein printing of a predetermined number of sheets has ended (timing T0). Also, Pr shows the state wherein the calibration operation performed during job execution is completed (timing T1).

As shown in FIG. 15, a shift occurs in the output density between the state Ps immediately following the calibration operation and the state Pe of the timing (T0) wherein printing is finished for the predetermined number of sheets. That is to say, a clear density shift exists in the printed image quality immediately following calibration and the printed image quality immediately preceding the next calibration. The degree (slope) of the density shift thereof depends on the features of the image data printed therebetween. That is to say, the density shift width differs with the case of printing many images with a high image density such as a solid image and the case of printing many images with a low image density having a large portion of white area such as a text image.

Thus, processing to correct such density shifting for each printing of predetermined number of sheets is calibration processing, but because of the processing configuration thereof, the processing must be performed by stopping the job currently having printing executed. Stopping a job during printing executing directly relates to decreased productivity of the printing apparatus. In order to increase productivity, extending the spacing between performing calibration processing, i.e., increasing the predetermined number of printing sheets increases productivity. However, the output image quality immediately following calibration and the output image quality immediately preceding the next calibration has a large image quality difference (density difference).

With a printing apparatus that creates high quality printed material and so forth in the "digital business printing" market, improved productivity and high quality image output are not simultaneously required. Also, in many cases, a printing apparatus for the "digital business printing" market has the functionality to exceed 100 sheets of printed sheets per minute, and a printer engine is employed wherein image quality and high quality image output are enabled.

In order to obtain high quality image output, density shifting should be suppressed as much as possible. That is to say, frequently performing calibration processing is ideal. However, while executing calibration processing, the job during printing output executing must be stopped, whereby the function of a POD high-speed device is not satisfied. Also, even if calibration processing is performed when printing every predetermined number of sheets, in the case of the POD high-speed device, the number of printed sheets per minute is high, so even if the predetermined number of sheets is 2000 sheets, calibration processing is performed once before 20 minutes have passed.

As to decreased productivity due to the calibration processing, Japanese Patent Laid-Open No. 2004-142163 discloses switching the density correcting processing based on the environmental temperature/humidity information inside and outside the apparatus. FIG. 16 shows a diagram of performance timing of the calibration processing with Japanese Patent Laid-Open No. 2004-142163. Selectively performing calibration with patch image output, or performing correction data generating based on simulation at the host side that is connected to the printing apparatus, at the time of environmental temperature/humidity change (Tk), is described. Productivity is increased by decreasing the number of times of calibration processing by patch image output at the printing apparatus side resulting from environmental temperature changes inside and outside the apparatus.

Also, Japanese Patent Laid-Open No. 11-177822 discloses changing timing of calibration processing according to the image output operation mode set by the user who uses the printing apparatus. FIG. 17 shows a diagram of performance timing of the calibration processing with Japanese Patent Laid-Open No. 11-177822. At calibration timing (T0) and thereafter, in the case that an operation mode is selected by the user which requires less frequent calibration processing of the patch image output, the next calibration timing (T1) is shifted later temporally. Thus, the number of times of calibration processing by patch image output at the printing apparatus side resulting from environmental temperature changes inside and outside the apparatus is decreased, thereby increasing productivity.

Japanese Patent Laid-Open No. 11-164148 discloses the correlation between the image output mode set by the user who is using the printing apparatus, the calibration processing, and the confirmation of predicted image quality. Specifically, description is given to show that the calibration processing can confirm the image quality of the job final image before executing the job, upon recognizing that calibration processing will start during job execution. FIG. 18 shows timing to perform calibration and timing to confirm virtual image quality with the Japanese Patent Laid-Open No. 11-164148.

Japanese Patent Laid-Open No. 11-164148 is described with the premise of the case that there are three types of operation modes of the calibration processing of the printing apparatus which are high-speed: every 300 sheets, standard: every 150 sheets, and high precision: every 50 sheets. In the case that the operation mode of the calibration processing is standard mode at the point-in-time of the user using the printing apparatus, and the number of sheets to be input is 200 sheets, calibration processing is executed after 150 sheets are printed (T0). Accordingly, the final image data of the job becomes image data at the point-in-time that 50 further sheets are printed after linear density correcting is performed by the calibration processing (Tjbe). Japanese Patent Laid-Open No. 11-164148 holds a density shift computing coefficient at the point-in-time of one sheet printed, and predicts and displays output image quality by proportion calculations. That is to say, with the previously described example, the coefficient value and the 50 sheets after executing calibration processing are multiplied, and a predicted output image is created. Upon the user confirming the predicted output image quality, selection/switching of the operation mode (high-speed/standard/high precision) of the calibration processing of the printing apparatus is performed.

However, with the current technology disclosed in Japanese Patent Laid-Open No. 2004-142163, reducing the number of times of calibration operation by the patch image output is mentioned, but for correcting the density shift, the focus thereof is only on parameters of the environment temperature/humidity. However, as described previously, important factors for the density shift of the output image after the predetermined number of sheets printed are not only environment temperature/humidity but also elements from the image density. Also, what sort of correcting table will be created to perform correcting processing in accordance with the parameters of the environment temperature/humidity is also not mentioned.

Also, with the current technology disclosed in Japanese Patent Laid-Open No. 11-177822, calibration spacing is variable in accordance with the operation modes of the printing apparatus. By extending calibration spacing, productivity increases, but the spacing to perform density shift correcting is extended, whereby actual output image quality does not move in the direction of achieving high image quality output, but moves in the direction to permit deterioration.

The current technology disclosed in Japanese Patent Laid-Open No. 11-164148 is an assistive function for the user to set the calibration operation mode before job execution, and is not related to correcting processing to improve output image quality. Also, the final output image quality of the job is predicted but parameter used for prediction is a constant, and influences from image data to be printed until the calibration is not considered.

That is to say, none of the current technologies described above offer solutions to the problem needed particularly for a POD high-speed device to achieve both high productivity and improved output image quality.

SUMMARY OF THE INVENTION

Provided are an image forming apparatus and method thereof, directed to improving both productivity and output image quality when performing printing of a large number of copies.

An image processing apparatus that prints image data including a plurality a pages one copy at a time, and prints multiple copies, includes a generating unit that generates a patch image having multiple densities, a forming unit that forms the patch image, on a photosensitive drum, and a reading unit that reads the density of the patch image, wherein the generating unit, the forming unit, and the reading unit execute processing at a time of ending printing for an N'th copy and at a time of ending printing for an (N+K)'th copy, where N is an integer and K is a natural number and further include a density shift amount computing unit configured to compute the density shift amount for a unit number of copies from a density reading value of the patch image at the time of ending printing for the N'th copy and of the patch image at the time of ending printing for an (N+K)'th copy, a table computing unit configured to compute a density correcting table to correct the density shift from a standard density for a unit number of copies, based on the density shift amount for the unit number of copies computed by the density shift amount computing unit, a holding unit configured to hold the density correcting table computed with the table computing unit, and a density shift correcting unit configured to correct the density shift from the standard density for a unit number of copies after the (N+K+1)'th copy and thereafter, using the density correcting table held with the holding unit.

An image processing apparatus that consecutively prints multiple copies of a same page, and prints multiple pages, includes a generating unit that generates a patch image having multiple densities, a forming unit that forms the patch image, and a reading unit that reads the density of the patch image, wherein the generating unit, the forming unit, and the reading unit execute processing at a time of ending printing for a same page of an N'th copy and at a time of ending printing for an (N+K)'th copy and further include a density shift amount computing unit configured to compute the density shift amount for a unit number of copies from a density reading value of the patch image at the time of ending printing for the N'th copy and of the patch image at the time of ending printing for an (N+K)'th copy, a table computing unit configured to compute a density correcting table to correct the density shift from a standard density for a unit number of copies, based on the density shift amount for the unit number of copies computed by the density shift amount computing unit, a holding unit configured to hold the density correcting table computed with the table computing unit, and a density shift correcting unit configured to correct the density shift from the standard density for a unit number of copies after the (N+K+1)'th copy and thereafter, using the density correcting table held with the holding unit.

According to the present invention, even in the case of performing printing of a large number of copies, a density shift during number-of-copies printing execution or a page printing execution can be corrected without performing calibration of the printer engine during printing processing execution.

Further features of the present invention will become apparent from the following description of exemplary embodiments with reference to the attached drawings.

BRIEF DESCRIPTION OF THE DRAWINGS

FIGS. 2A through 2C are diagrams illustrating a configuration for printing a number of copies and a configuration for printing pages.

FIG. 4 is a diagram illustrating calibration executing timing according to the configuration for printing a number of copies.

FIG. 6 is a schematic diagram of the configuration for printing pages according to the first embodiment.

FIGS. 12A through 12D are diagrams illustrating a patch image configuration.

FIG. 13 is a diagram illustrating a configuration to read a density value of the patch image.

DESCRIPTION OF THE EMBODIMENTS

Figure 1:
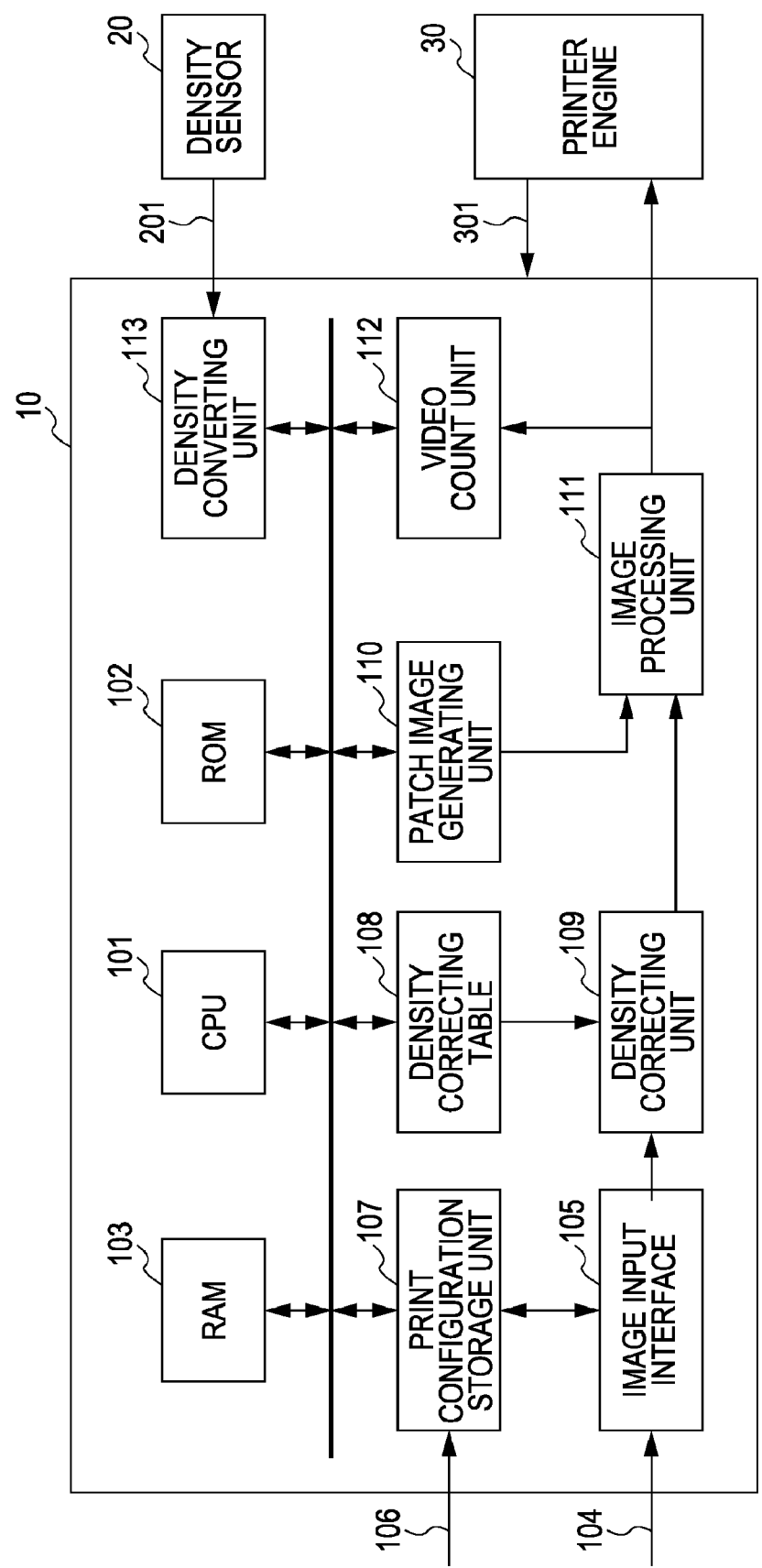
FIG. 1 is a diagram illustrating an image forming apparatus according to a first or second or third embodiment of the present invention.

Exemplary embodiments of the present invention will be described below with reference to the appended drawings.
First Embodiment FIG. 1 is a block diagram illustrating an image forming apparatus according to a first embodiment. The image forming apparatus according to the present embodiment is made up of an image forming unit 10 to perform taking in of image data and forming an image, a density sensor 20 to measure a density value of a patch image data at the time of calibration operation, and a printer engine 30 to print image data output by the image forming unit 10. The image forming apparatus according to the present embodiment is, for example, a printing apparatus, photocopier, or MFP (Multi Function Printer) having the combined functions of a facsimile/copier/printer, and so forth.

Also, the image forming unit 10 is made up of a processing block as described below. 101 denotes a central processing unit (hereafter, CPU) to configure the entire image device, 102 denotes a read-only memory (hereafter, ROM) that stores the control program of the CPU 101. 103 denotes a random-access memory (hereafter, RAM) that stores data used in the event of control operations according to the ROM 102 by the CPU 101 or handled as a work area. Reference numeral 104 denotes a host connected to the image forming apparatus, or an image data input bus to input from a document reading apparatus, in the case that the image forming apparatus is configured as an MFP. 105 denotes an image input interface, and receives image data input from the image data input bus 104.

Reference numeral 106 denotes a signal bus wherein the printing configuration of the image data input from the image data input bus 104 and the number of pages making up the image data is notified. Hereafter, the printing configuration will be described with reference to the drawings. FIG. 2A is an example in the case that a portion of the image data input in the image input interface 105 is made up of 30 pages of image data.

A printing configuration indicates how to print the image data, and one is a number-of-copies printing configuration wherein image data made up of multiple pages is printed every number of copies. That is to say, number of copies printing is a configuration to print multiple number of copies by printing image data made up of multiple pages, one number of copies at a time.

FIG. 2B is a diagram showing a printing configuration in the case of printing 200 copies of the image data made up in FIG. 2A. As shown in FIG. 2B, in the case of number-of-copies printing configuration, all of the pages making up one copy are sequentially printed one sheet at a time. That is to say, first, printing is performed for the first page, then printing is performed while changing the printing page as the second page next, then the third page. At the point-in-time that the printing is ended for the 30th page (Te0), determination is made that printing is ended for one copy, and next printing is started for the second copy. That is to say, printing is performed again for the first page, second page, third page, and so forth. The ending of printing output is at the point-in-time that printing is ended for 200 copies (Tjbe0), i.e. the point-in-time when printing output of the 30th page of the 200th copy ending.

A second printing configuration is a page printing configuration wherein the image data made up of multiple sheets outputs the number of copies worth in increments of image data making up the pages, and changes printing pages. That is to say, the page printing configuration is a printing configuration to continuously print the same page multiple number of copies worth, and prints multiple pages.

FIG. 2C is a diagram illustrating a printing configuration in the case of printing 200 copies of the image data made up in FIG. 2A. As shown in FIG. 2C, in the case of page printing configuration, printing is performed for the number of copies worth, with a page as the increment making up a copy. That is to say, first, the image data of the first page is continuously printed for the number of copies worth. In other words, at the point-in-time of having printed 200 sheets of image data of the first page (Te1), the printing page switches. Accordingly, the ending timing of the printing output is at the point-in-time that 200 sheets of the image data for the 30th page is output (Tjbe1).

Note that with the description relating to the above-described printing configuration, description is given as printing being performed from the first page regardless of printing configuration, but the above description is one example, and an arrangement may be made wherein printing is started from the final page such that sequential sorting is performed in the state of printing output. In other words, with the example of the above-described printing configuration, an arrangement may be made wherein printing is started from the 30th page.

Reference numeral 107 denotes a printing configuration storage unit, and holds information input via the signal bus 106, i.e. the printing configuration and the number of pages making up one copy.

Figure 14A:
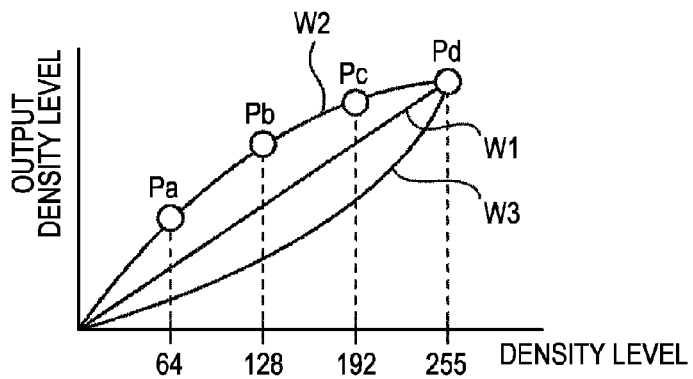
FIGS. 14A through 14C are diagrams illustrating density correcting table generating with the calibration operation.
Figure 14B:
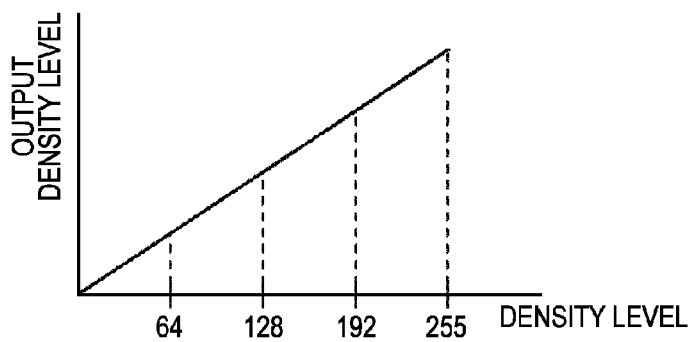
Figure 14C:
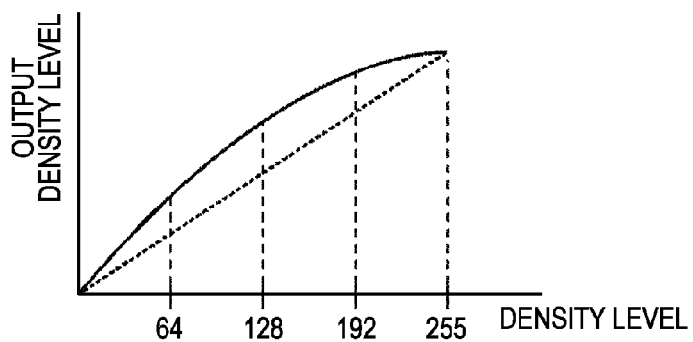
Figure 15:
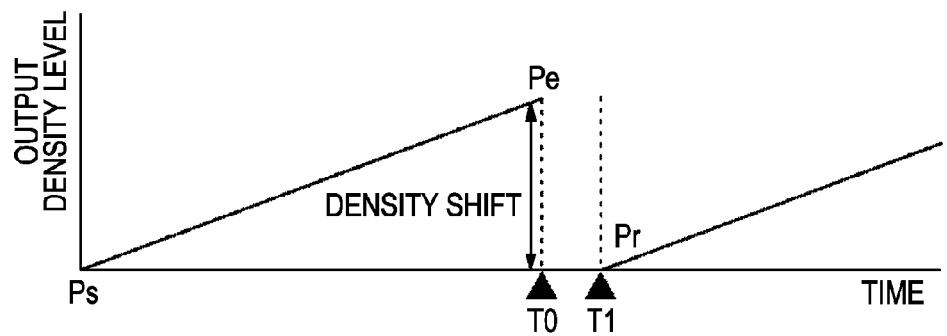
FIG. 15 is a diagram illustrating density shifting with the calibration operation.
Figure 16:
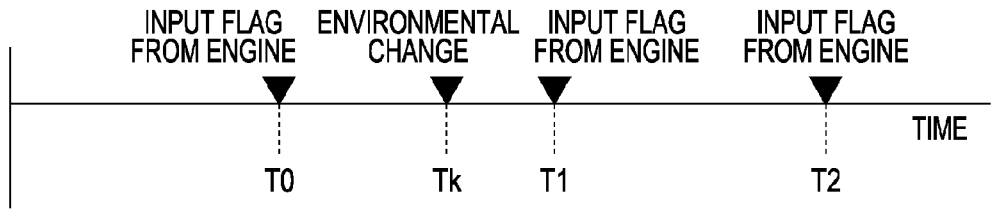
FIG. 16 is a diagram illustrating calibration timing according to previous technology.
Figure 17:
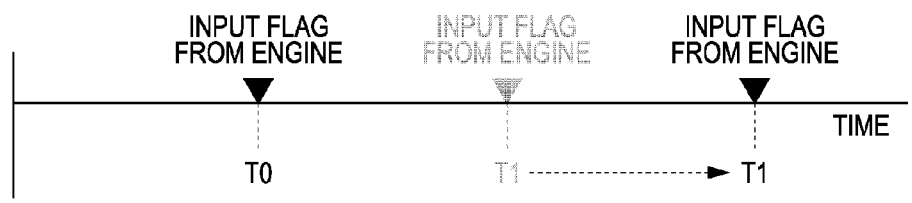
FIG. 17 is a diagram illustrating calibration timing according to previous technology.
Figure 18:
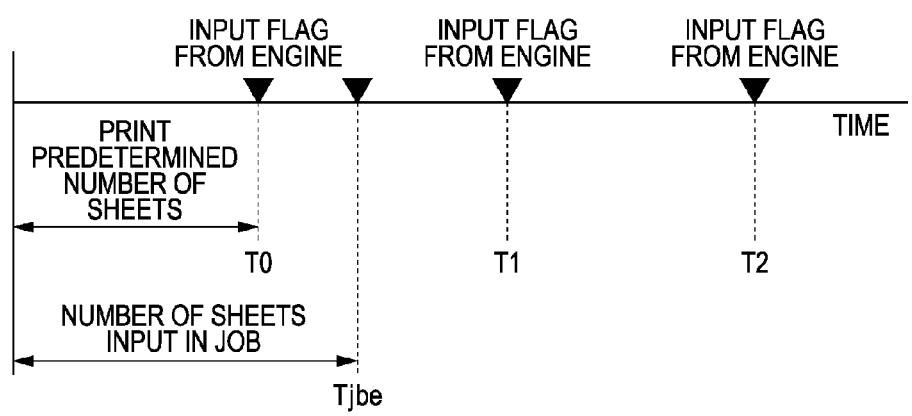
FIG. 18 is a diagram illustrating calibration timing according to previous technology.

Reference numeral 108 denotes a density correcting table, and a correcting coefficient is set by the CPU 101. The set correcting coefficient is to cause the density shifting of the reading density of the patch image to be linear density at the time of calibration operation. That is to say, a correcting coefficient equating to W3 in FIG. 14A is set.

Reference numeral 109 denotes a density correcting unit that uses a correcting coefficient stored in the density correcting table 108 to perform correcting processing as to the image data output from the image input interface 105. With the correcting processing with the density correcting unit 109, linear density in the event that input image data is output can be achieved.

Reference numeral 110 denotes a patch image generating unit to generate a patch image wherein image-forming is performed at time of calibration operation, and 111 denotes an image processing unit to perform image processing as to image data that the density correcting unit 109 or patch image generating unit 110 outputs.

Processing with the image processing unit 111 is processing for converting the input image data into image configuration/image bit numbers to be output as printing, and for example is relevant to image processing including such as dither processing, screen processing, and error diffusion processing, for example. Note that with the image forming apparatus according to the present embodiment, the processing content of the image is not particularly limited, as long as the processing is convertible to image configuration/image bit numbers that can be output with image output processing at a later stage.

Reference numeral 112 denotes a video count unit which counts pixels consumed by toner in the event of printing image data that is processed with the image processing unit 111. For example, in the case that the output image data is black-and-white image data, the pixels that toner with a K component consumes are counted, and in the case that color image data is output, the pixels that each component of C, M, Y, K consume are each counted. 113 denotes a density converting unit to convert a sensor reading value from a later-described density sensor 20 to a density level.

A signal 201 output from the density sensor 20 is a reading value of the patch image data image-formed on an unshown photosensitive drum at the time of calibration processing operation, and is output as to the density converting unit 113 within the image forming unit 10. Also, a signal 301 output from the printer engine 30 is a calibration request flag/interrupt signal output on the image forming unit 10 side at the point-in-time that printing worth a predetermined number of sheets has ended.

Figure 3B:
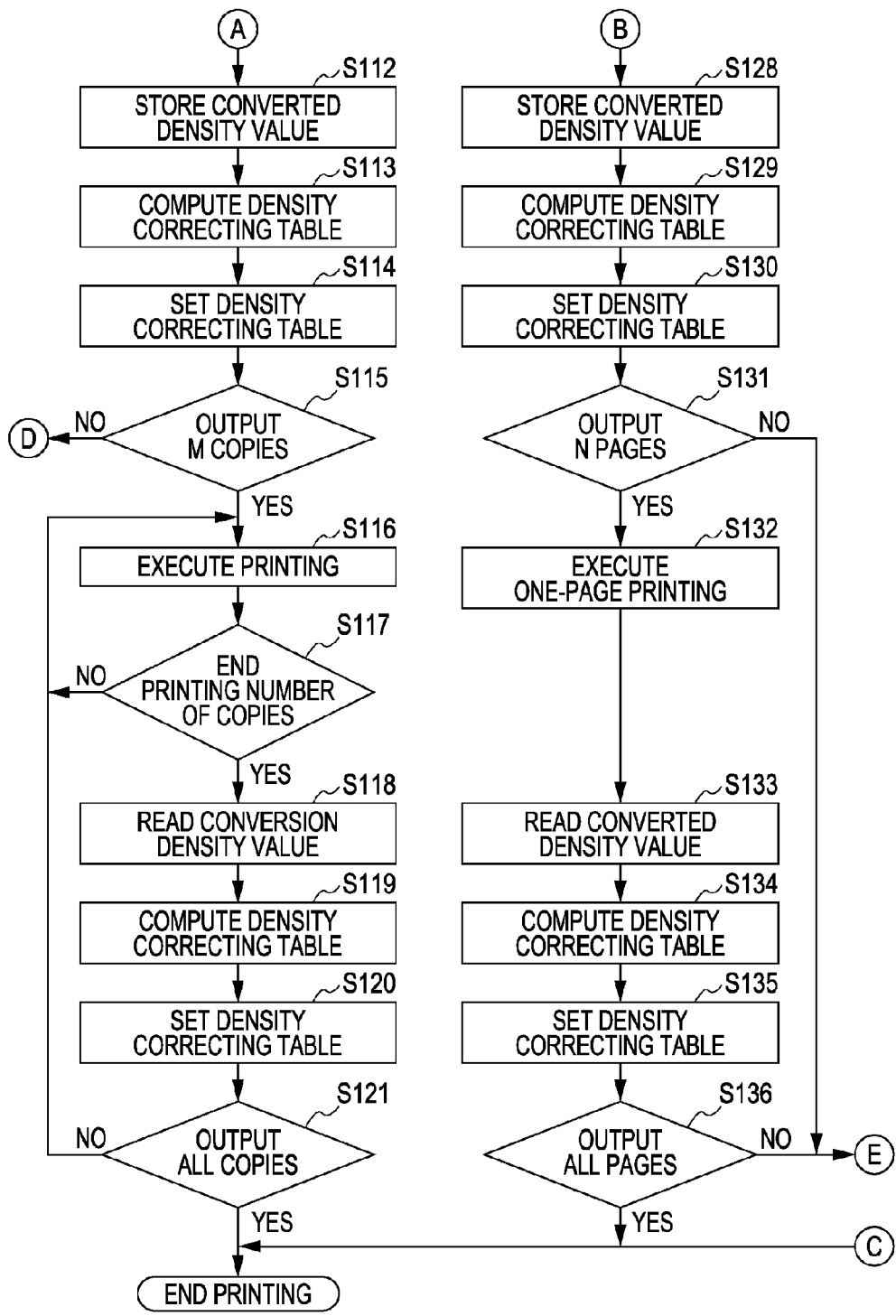
FIG. 3 is a diagram describing operational flow according to the first embodiment.

Next, the correcting processing operation flow of the image forming apparatus according to the present invention will be described with reference to FIG. 3. FIG. 3 is an operation flow showing a density correcting method of the image forming apparatus. Note that the image forming apparatus in the description hereafter presumes a black-and-white POD high-speed device. Also, description is given with the assumption that number of printed sheets for which the printer engine requires calibration processing is every 2000 sheets.

With the image forming apparatus to which the present invention is applied, upon a printed job being input, the CPU 101 performs determination as to whether the input job is printing for a large number of copies (step S101). In the case that the job is printing is for a small number of copies, the image forming apparatus starts printing of the input image data (step S102). That is to say, printing is started for the printing configuration which is information notified via the signal bus 106 and the number of printing pages. In the case that the printing configuration is number-of-copies printing configuration, each page making up the image data is printed one sheet at a time, and following the printing for one copy ending, printing is output for the number of copies worth. In the case that the printing configuration is page-printing configuration, each page making up the image data is continuously printed for the number of copies worth.

The image data input via the image data input bus 104 and image input interface 105 uses a predetermined set value that is set in the density correcting table 108 to correct with the density correcting unit 109. The image data after executing density correcting is subject to image processing by the image processing unit 111, is output to the printer engine 30, and printing is performed until all input image data is output as printing (step S103).

Note that in the event that during executing printing for a small number of copies, the state of the printer engine 30 reaches the number of printed sheets for which calibration processing is necessary, the printer engine 30 outputs a trigger/interrupt signal 301 as to the image forming unit 10 to prompt calibration operation executing. Upon receiving the trigger/interrupt signal 301, the CPU 101 of the image forming apparatus 10 interrupts the printing and performs calibration processing operation.

Specifically, the CPU 101 instructs the patch image generating unit 110 to output the patch image. The patch image generating unit 110 outputs patch image data as to the image processing unit 111. The image processing unit 111 subjects the predetermined patch image data to predetermined image processing, and outputs the output image data as to the printer engine 30. The output patch image data is image-formed on the photosensitive drum, and a density value is read by the density sensor 20. The read value is input as a signal 201 in the density converting unit 113 and converted to a measurement density value. The CPU 101 computes a density correcting table such that the job executions hereafter become linear density, based on the measurement density values for each patch after conversion by the density converting unit 113, and reflects this in a density correcting table 108. Upon completing density correcting coefficient setting to the density correcting table 108, the CPU 101 restarts job execution, i.e. printing processing.

With the description above, following the flag/interrupt signal 301 prompting the calibration processing input from the printer engine 30 being generated at the time of executing printing for a small number of copies, the calibration operation is immediately performed, but this response is not a required condition. That is because at the time of printing for a small number of copies, the job executing time is not very long so the printing density shift does not become very large. That is to say, a control may be in place wherein, even if the flag/interrupt signal 301 is input, calibration processing operation is extended until the job being executed is completed. With this control, decreased productivity resulting from the calibration processing operations can be suppressed.

Next, the density correcting processing of the present embodiment will be described. Note that the premise of the description hereafter is a case wherein the input job is printing for a large number of copies such as printing 200 copies of the image data making up 30 pages for one copy, for example.

In step S101, in the case that the input job is determined to be a printing for a large number of copies, the CPU 101 reads the video count value of the video count unit 112 at that point-in-time before starting printing (step S104). Next, the CPU 101 reads the printing configuration notified via the signal bus 106 and the print pages from the printing configuration storage unit 107. In the case that the printing configuration stored in the printing configuration storage unit 107 is number-of-copies printing configuration, the CPU 101 moves to processing with number-of-copies printing configuration (step S105).

The execution of the printing processing is performed as to the image data input via the image data input bus 104. Specifically, first, the density correcting unit 109 performs density correcting processing using the density correcting table set in the density correcting table 108 by the CPU 101. The density-corrected image data is output to the image processing unit 111 and subjected to image processing. The processing performed with the image processing unit 111 should include at least processing to convert to a configuration where the printer engine 30 can print. That is to say, processing to convert to a bit configuration where the printer engine 30 can output, i.e. processing made up of screen processing or error diffusing processing or the like may be used. Note that with the above description, image processing content relating to the conversion of a bit configuration is described, but the processing content of the image processing unit 111 with the present embodiment is not restricted to this. That is to say, color-space conversion or filtering processing and so forth may be performed as to the image data input in the image processing unit 111.

The image data processed with the image processing unit 111 is output to the printer engine 30 and is printed (step S106). Note that the image data that the image processing unit 111 outputs to the printer engine 30 is output in parallel as to the video count unit 112 also. In the event of printing image data processed by the image processing unit 111, the video count unit 112 performs counting of image data that consumes toner.

The CPU 101 continuously performs the printing execution in step S106 until printing of one copy is ended (step S107). That is to say, with the present embodiment, execution is repeated until 30 pages worth of printing is ended. Upon printing of one copy ending, the CPU 101 instructs the patch image generating unit 110 to output the patch image. Also, at the same time the CPU 101 reads the video count value of the video count unit 112 (step S108). Upon receiving instructions to output the patch image from the CPU 101, the patch image generating unit 110 performs output of the patch image data (step S109). In the case that the patch image defined with the printer engine 30 is four types, for example, and in the case that the densities are each 64, 128, 192, 255, the patch image generating unit 110 outputs the image data of predetermined size serving as density to the image processing unit 111, as to the image forming unit 10.

The image processing unit 111 subjects the input patch image to image processing, and outputs the patch image as to the printer engine 30. The output patch image data following the image processing is image-formed on an unshown photosensitive drum. Next, the patch image data image-formed on the photosensitive drum is read by the density sensor 20 for each patch image (step S110). The image read by the density sensor 20 is output as the signal 201 to the density converting unit 113 within the image forming unit 10. The density converting unit 113 converts the value of the signal 201 read by the density sensor 20 (step S111). The CPU 101 reads the density values converted with the density converting unit 113 for each patch image and stores these in work areas of the RAM 103 (step S112).

Next, the CPU 101 performs computing of the density correcting table to correct the density shifting from the standard density which is the original density of the patch, based on the densities of each patch image read in step S110. Specifically, based on the density values of the patch image densities 64, 128, 192, 255 according to the present embodiment, interpolating processing such as linear interpolating is performed as to the portions that do not have the density of the patch image, and computes density shift amount as to the entire density (W2 in FIG. 14A).

The features of W2 indicate density shift after the printing of one copy made up of 30 pages. That is to say, the difference between the linear density W1 and the density shift feature W2 after outputting one printed copy indicates the density shift amount by one printed copy during execution. As already described, the amount of density shift depends on the image density of the image data subjected to printing execution. That is to say, the W2 feature can be handled as the density shift amount based on the image density of the printing of one copy.

Also, as a manner of confirming image density by the printing of one copy, the CPU 101 uses the video count value read in steps S104 and S108. That is to say, the video count value from the printing execution of copy is computed by subtracting the video count value read in step S104 from the video count value read in step S108. The video count value is stored in a work area of the RAM 103 by the CPU 101. At this time, the video count values held in steps S104 and S108 are also held without change. That is to say, the video count value read in each step and the video count value from the printing of one copy are each stored in separate areas.

The CPU 101 computes the density correcting table that is set in the density correcting table 108 (step S113). Specifically, an inverse conversion table that converts the W2 density shift to the linear density W1 is computed (W3 in FIG. 14A). Next, the CPU 101 sets the computed density correcting table in the density correcting table 108 (step S114).

The CPU 101 repeats the processing in steps S106 through S114 worth a predetermined number of copies (step S113). For example, in the case of repeating until the printing of 2 copies has ended, the value of M in step S115 in FIG. 3 becomes 2. In this case, the processing in steps S106 through S114 is repeated twice, whereby patch image output, patch image density measuring, and density value conversion are performed twice.

The image density from executing printing of the second copy is also confirmed using the video count value. That is to say, using the video count value read in step S108 at the time of executing printing of the second copy and the video count value read in step S108 at the time of executing printing of the first copy, the video count value of printing one copy is computed.

The image data during execution of printing output is the same for number-of-copies configuration, so the video count value computed at the time of the printing of the first copy being completed and so the video count value computed at the time of the printing of the second copy being completed should be similar values. That is to say, in the case that the computed video count value after printing each copy which is computed by the CPU 101 is similar, the flow is advanced to the next processing step (step S115). That is to say, the CPU 101 starts printing output of the third copy (step S116). Upon printing output of the third copy ending, the CPU 101 uses the patch image density value after the first printing ended which is stored in a work area of the RAM 103, and each patch image density value after printing of the second copy has ended, to obtain the density correcting table set in the density correcting table 108. That is to say, each patch image density value after ending printing of the first copy stored in the RAM 103 and the patch image density value after ending printing of the second copy are read (step S118).

A usage method of each patch image density value read multiple times will be described with reference to another diagram. FIG. 4 shows the calibration operation timing and the measurement density value of each patch image at the time of performing calibration, with time parameter along the horizontal axis.

In FIG. 4, Ts indicates printing starting timing. T1 denotes a first calibration operation timing, i.e. the timing after printing one copy with number-of-copies printing configuration, T2 denotes a second calibration operation timing, i.e. the timing after printing two copies. Also, the patch images A, B, C, and D shown at the positions of T1 or T2 indicates patch images used at the time of each calibration operation, and with the present description the image A is shown as density: 64, image B as density: 128, image C as density: 192, and image D as density: 255.

The a1, b1, c1, and d1 shown beside each patch image with the T1 timing indicates density values read with the density sensor 20 by the first calibration operation. Similarly, the a2, b2, c2, and d2 shown beside each patch image with the T2 timing indicates density values read with the density sensor 20 by the second calibration operation.

In the case of a number-of-copies printing configuration, the timing for performing each calibration is after ending printing the number of copies. Accordingly, the definition of image density with number-of-copies printing configuration becomes toner consumption amount in the case of performing printing of one copy (incremental amount of video count value). The image data to be printed is the same where one copy is a unit, so in the case of number-of-copies printing configuration, the image density after printing one copy remains the same. Accordingly, if we say there is no density shift amount at Ts, the timing at T1 and T2 is after printing of one page worth of the same image data for each, whereby the density shift amounts by the printing are roughly the same. That is to say, a1 and a2, b1 and b2, c1 and c2, and d1 and d2 are similar values.

Accordingly, the density shift amount after ending printing of the remaining number of copies is predicted using the above-mentioned a1, b1, c1, and d1, and a2, b2, c2, and d2. For example, as shown in FIG. 4, in the case of predicting with the results of two calibration operations, an average of each density measurement value of the patch image data is used as the density shift amount after ending printing of the remaining number of copies. Thus, the density shift amount for the third copy and thereafter no longer needs to be measured with calibration processing. Also, according to the predicted density shift amount, the density correcting table can be corrected and set. Note that an arrangement may be made wherein only the density value read by the second calibration operation is used as a density shift amount after ending printing of the remaining number of copies.

That is to say, from the video count value reading in step S108 to the density correcting table setting in step S114 are executed at the time of ending printing for the N'th copy (N is an integer) and at the time of ending printing for the (N+K)'th copy (K is a natural number). The density shift amount for each unit copy is computed from the patch image density read in S110 at the time of ending printing for the N'th copy and the patch image density read in s110 at the time of ending printing for the (N+K)'th copy, and a density correcting table is obtained. Using the density correcting table mentioned above, density shift from the standard density for each unit copy at the (N+K+1)'th copy and thereafter are corrected.

Upon the number-of-copies printing is ended in step S117, the CPU 101 performs reading of the converted density value measured across multiple times from the time of printing starting (step S118). Subsequently, the density correcting table is computed based on the conversion density value for each time (step S119). An arrangement may be made wherein the conversion density value used in step S119 is the conversion density value for each time subjected to averaging processing, or an arrangement may be made wherein in the case that there is no variation to the conversion density values for each time, the newest conversion density value is used.

The CPU 101 sets the density correcting table computed in step S119 as the density correcting table 108 (step S120). The set table values are based on the image density with a number-of-copies printing configuration, whereby the density shift amount after ending printing of the one copy thereafter (printing of unit number of copies) can be appropriately corrected.

Thereafter, until printing is ended of all of the copies, instructions are given to continuously execute the printing output operations (step S121). However, after outputting printing of one copy after step S116, processing to step the input job is not performed. That is to say, after the ending printing of one copy after step S116, calibration processing wherein the patch image is output and performed is not performed at all. For example, with the present embodiment, from the time of printing starting until the printing output for 2 copies is completed, calibration processing is performed, but for the remaining 198 copies of printing output, calibration operation is not performed. Since a density correcting table is set which considers the density shift amount after each copy printed, even if calibration operation is not performed, a constantly stable printing output is enabled.

Note that in step S108, in the case that the computed video count value after completing printing of the first copy and the computed video count value after completing printing of the second copy differ greatly, processing is performed from step S106 through S114 until printing for one more copy is completed. The computed video count value after completing printing of the third copy and the computed video count values of the first copy and second copy are compared, thereby performing averaging of the computed video count values for the first, second, and third copies. Thus, accuracy of the density correcting processing by predicting can be increased.

Figure 5:
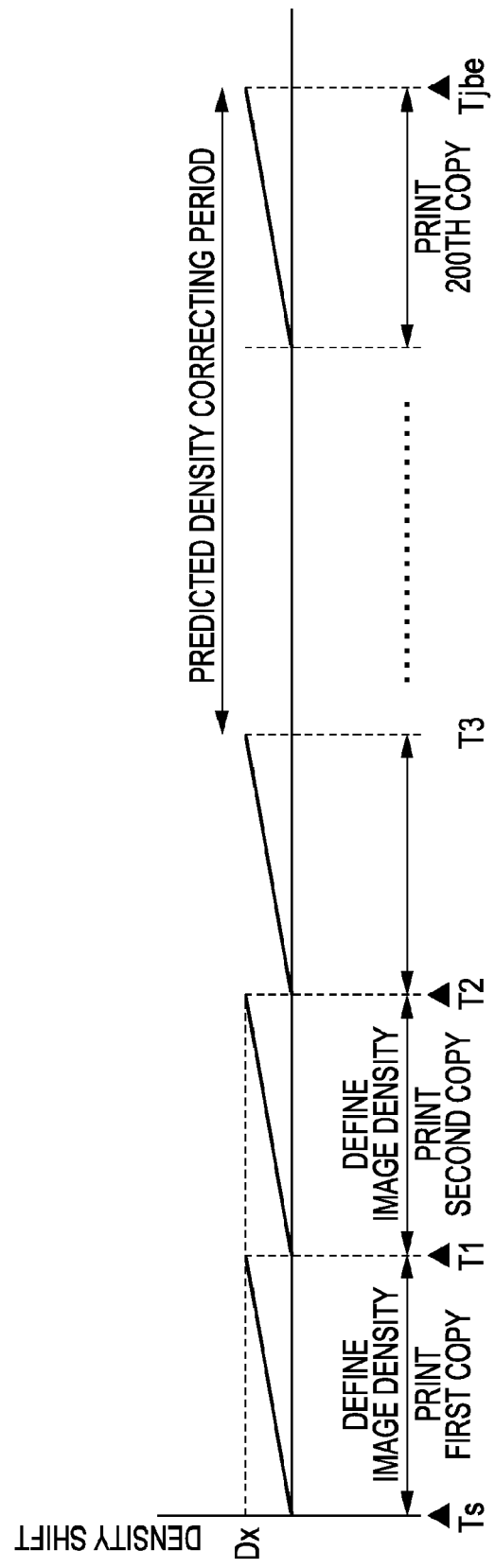
FIG. 5 is a schematic diagram of the configuration for number-of-copies printing according to the first embodiment.

An operation schematic diagram with number-of-copies printing configuration is shown in FIG. 5. FIG. 5 is a diagram showing time for the horizontal axis and density shift amount for the vertical axis. In FIG. 5, Ts denotes printing starting timing, and T1 and T2 denote printing ending timing for one copy making up the image data that is printed. Also, Tjbe denotes the timing that the printing of the input job is completed.

In the case of number-of-copies printing configuration, at the time of printing of M copies at the beginning of printing, calibration is performed at the time of completing printing of one copy. Accordingly, for example, if M is 2, calibration processing is performed only at the timings T1 and T2. Subsequently, using the density shift amount Dy for each patch (the value of Dy differs by patch image) from the calibration operations at the T1 and T2 timings, the density correcting table for subsequent printing is computed and set. Accordingly, at the time of printing of the third copy and thereafter, calibration operation is not performed, but density correcting processing by the density correcting table based on predicted density shift is performed.

Also, the density correcting table for the printing thereafter is used to compute and set the density shift amount: Dy at the time of completing printing of one copy, whereby in the case of performing printing for number of copies thereafter, printing can be performed without the density shift amount exceeding Dy.

Next, in step S105, a case of page printing configuration will be described. In the case that the information relating to the printing configuration stored in the printing configuration storage unit 107 is page printing configuration, the CPU 101 moves to the next step and performs printing processing (step S122).

Page printing configuration is a configuration to print each page of the image data to be printed worth the number of copies. With this printing configuration, the CPU 101 determines whether or not one page worth of printing has ended (step S123). At the time of starting printing, determination is made whether the image data of the first page of the image data to be printed has been printed for one page worth. Upon printing of one page ending, the CPU 101 reads the video count value stored in the video count unit 112 (step S124).

The difference between the video count value read in step S104 and the video count value read in step S124 shows the image density at the printing of one page. The CPU 101 stores the read video count value difference in the RAM 103.

Upon one page worth of printing being completed, the CPU 101 outputs calibration operation instructions. That is to say, the CPU 101 executes processing to output the patch image (step S125), read the patch image density (step S126), convert density of the sensor reading value (step S127), and stored the converted density value (step S128). Using the stored converted density value, the density correcting table is computed (step S129), and the computed density correcting table is set in the density correcting table 108 (step S130).

Note that the processing in the steps S125 through S130 are the same as the steps S109 through S114, so the description of the operation thereof will be omitted.

With page printing configuration, the processing in steps S125 through S130 are executed worth the first N pages, for every page to be printed (step S131). The reason for this is that with page printing configuration, the image data making up one page becomes the image density, and that density shift amount depending on the image density thereof can occur. However, the image density definition unit mentioned above is only an example, and in cases wherein the number of copies to be printed is extremely large, an arrangement may be made wherein the definition of image density is after printing multiple pages of the same page data. Specifically, in a case such as the number of copies to be printed exceeds 1000 copies, with the page printing configuration, the same data is continuously printed for 1000 sheets. The definition of image density in such a case may be at the time of completing printing 5 pages, for each page, and image density may be defined by two calibration operations from the printing start until printing output is completed for 10 sheets. Note that confirmation of the image density may be performed based on the incremental amount of the video count values stored in the RAM 103 during the printing of the first N pages worth, each time the page to be printed switches.

Upon the predetermined number of pages worth of printing is ended, the flow advances to the next processing step. That is to say, printing is performed for the next page (step S132). The converted density value measured before executing step S132 is read and referenced (step S133), and the density correcting table is computed (step S134). In this case also, similar to number-of-copies printing configuration, the measurement of the calibration operation before executing step S132 and the converted density values are used to compute the density correcting table.

The CPU 101 sets the computed density correcting table in the density correcting table 108 (step S135). That is to say, at the time of printing the subsequent pages, calibration processing is not performed, but at the time of printing, density correcting processing is performed using an appropriate density correcting table, i.e. the density correcting table set in step S135.

In the case of page printing configuration, each time the page to be printed changes, the processing in the steps S122 through S135 is performed. That is to say, each time the page data to be printed changed, until the first N sheets of such page are printed, the calibration processing is performed. At the time of subsequent printing, calibration operations are not performed, and appropriate density correcting processing is used.

An operation schematic diagram of page printing configuration is shown in FIG. 6. FIG. 6 is a diagram showing time for the horizontal axis and density shift amount for the vertical axis. In FIG. 6, Ts indicates printing starting timing, and T1 and T2 indicate printing ending timing of the first page and second page making up the image data to be printed. Also, T11, T12, T21, T22 are printing ending timings worth one page of each page, while showing the calibration operation timings. Also, Tjbe is the timing that the printing of the input job is completed.

In the case of page printing configuration, calibration operation is performed at the time that the printing output of the first N pages after the page to be printed is switched. Accordingly, at the time of printing of the first page, calibration operations are performed at the T11 and T12 timing. Using the density shift amounts Dy for each patch at the T11 and T12 timings by the calibration operation (the value of Dy differs by patch image), the density correcting table at the printing thereafter is computed and set. Accordingly, the first two pages are subjected to density correcting processing with the predicted density shift without performing calibration operation during the period T12 to T1, and T22 to T2.

Also, the density correcting table with the printing thereafter is computed and set using the density shift amount: Dy at the time of printing output completed of one page worth (unit page). Therefore, thereafter, in the case of performing one page worth of printing, printing can be performed without the density shift amount exceeding Dy.

Note that as already described, T11, T12, T21, T22, ... in FIG. 6 do not necessarily have to be at the point-in-time that printing of one page worth is completed. That is to say, in the case that the number of printed copies is large, T11, T12, T21, T22, ... may be set with multiple pages as a unit.

The image forming apparatus according to the present embodiment, even if a calibration request signal 301 from the printer engine 30 is input in the image forming unit 10 at the point-in-time that printing of an input large-capacity printing job is started, regardless of printing configuration, the request thereof is ignored. That is to say, whether if in number-of-copies printing configuration or if in page printing configuration, at the time of executing printing of a large amount printing job, density correcting is performed primarily with the density correcting processing from predictions. Thereby, productivity improvements and printing output image quality improvements can be realized.

As described above, according to the first embodiment, in the case of printing the same job in large numbers, according to the printing configuration, the image density and timing wherein density correction accuracy is highest is set, and calibration processing is performed only for a limited number of times of set timings. The amount of measurement density values is stored as necessary according to calibration operation, and referenced as the density correcting table is rewritten, without performing calibration operation at the set timing. That is to say, calibration operation is not performed during the majority of time of large number of copies printing, whereby productivity is increased, and with the appropriate rewriting of the density correcting table, image quality of the printed imaged can be improved.

Second Embodiment

Next, a second embodiment will be described. With the first embodiment, in the case that the printing configuration is number-of-copies printing configuration, one copy of image data wherein image density is printed is defined as a unit. With the second embodiment, the case of changing the image density definition in the case of number-of-copies printing configuration will be described. Note that with the description of the second embodiment, in cases where the diagrams and reference numerals are the same as the description in the first embodiment, the same reference numerals will be used for description.

Figure 7B:
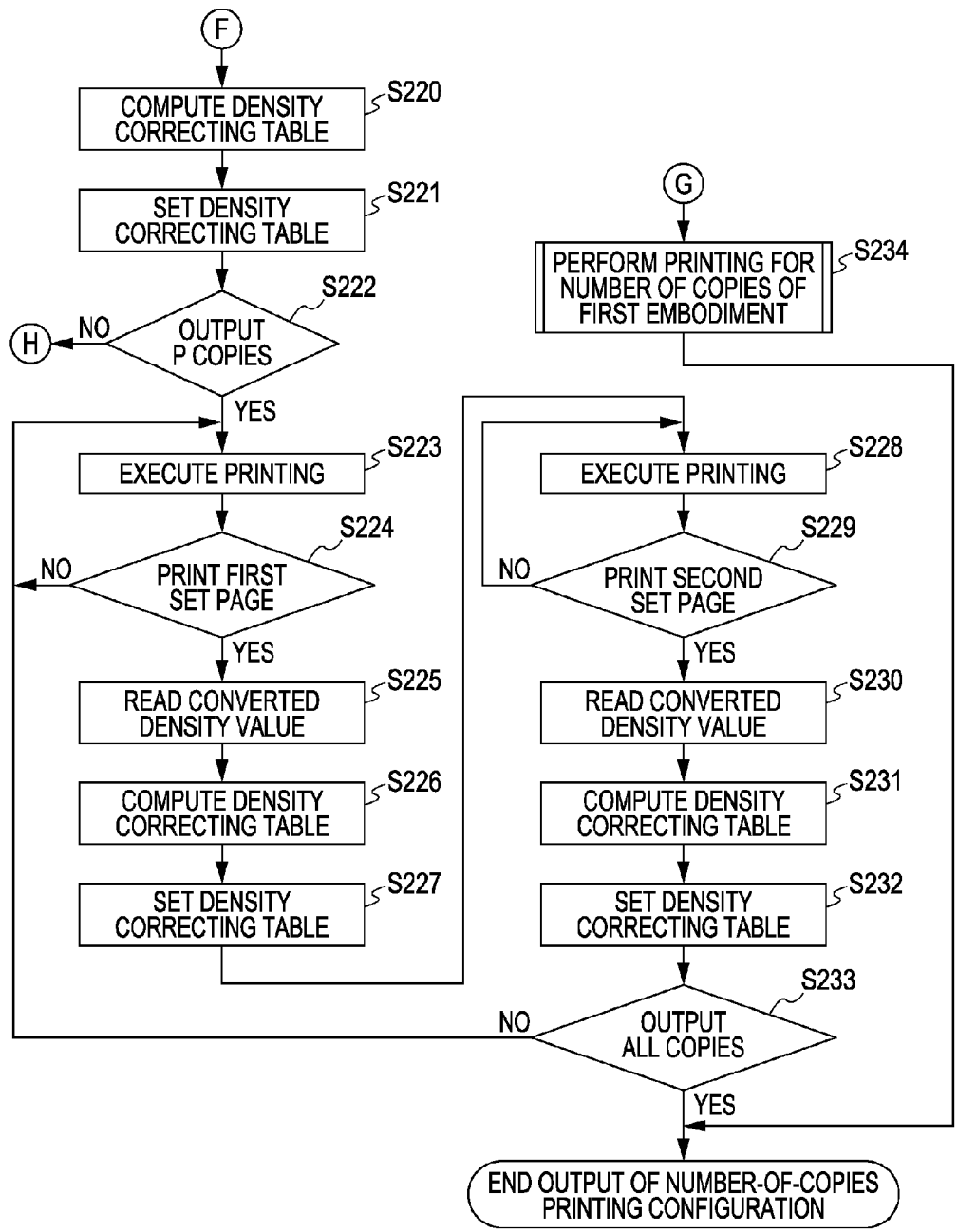
FIG. 7 is a diagram describing operational flow according to the second embodiment.

FIG. 7 shows an operation flow of the second embodiment. In the case that the input job is large number of copies printing, and the printing configuration is number-of-copies printing configuration, the CPU 101 performs confirmation of the number of pages to configure one copy (step S201). In the case that the number of pages making up one copy is less than predetermined number of pages: TH, printing processing is performed according to the operation flow of the number-of-copies printing configuration described in the first embodiment (step S234). Note that the processing in step S234 is the same as the first embodiment so the description herein will be omitted.

In step S201, in the case that the number of pages making up one copy is greater than predetermined number of pages: TH, similar to the printing starting time of the first embodiment, the CPU 101 reads the video count values stored in the video count unit 112 (step S202). The video count values are read in order to confirm the image density, similar to the first embodiment.

Next, the CPU 101 changes the image density unit (step S203). Specifically, the number of pages making up one copy of image data to be printed that is stored in the printing configuration storage unit 107 is referenced, and the pages making up one copy are segmented into multiple page groups. Note that with the description hereafter, the number of pages making up one copy is 100 pages, and as a definition of the image density, the 100 pages are segmented into two which are 50 pages of the first half and 50 pages of the latter half.

Upon the definition of the image density ending, the printing output is started (step S204). The CPU 101 manages printing pages, and confirmation is performed as to whether the pages subjected to printing have reached a first set page, i.e. in the present description have reached 50 pages (step S205). In step S205, in the case that the number of printing pages have not reached the first set page, the printing is intermittently performed. In step S205, in the case that the printed page has reached the first set page, the CPU 101 moves to the next processing.

That is to say, the video count value stored in the video count unit 112 is read in order to research the toner consumption amount of the image data printed up to this point (step S206). By comparing the video count value read in step S206 and the video count value read in step S202, the amount of consumed toner up to the first set page can be computed. This computed value is handled as the image density up to the first set page. That is to say, as a parameter for image density confirmation with the processing hereafter, the computed value is held in a work area in RAM 103.

Upon ending reading the video count value, the CPU 101 executes calibration operation. That is to say, the patch image output made up of multiple defined densities serving as the printer engine 30 is provided to the patch image generating unit 110. Upon receiving instructions from the CPU 101, the patch image generating unit 110 outputs patch image data to the image processing unit 111 (step S207). The output patch image is image-formed on the photosensitive drum of the printer engine 30. The formed patch image is then read by the density sensor 20 (step S208) and converted as density shift amount by the density converting unit 113 (step S209). The converted density value is read by the CPU 101, and is stored in the RAM 103 (step S210). The converted density value indicates the density shift amount of each patch image in the case of performing printing up to the first set page.

Next, the CPU 101 references the density shift amount of each patch image and computes the density correcting table (step S211). In computing the density correcting table, similar to the first embodiment, a density level with no converted density value serving as a patch image is computed with linear interpolation or interpolation processing using a quadratic term.

Next the CPU 101 sets the computed density correcting table in the density correcting table 108 (step S212). By the calibration processing from step S207 through step S212 being performed at this timing, linear density before the remaining printing is assured.

After the calibration operation by the execution of steps S207 through S212 is ended, the image forming apparatus restarts the printing (step S213). Next, the CPU 101 continuously executes printing processing until the printing up to the second set page is ended (step S214). With the present embodiment, the pages making up one copy are segmented into two, so the timing to print the second set page becomes the timing after printing output of the last page making up one copy is ended.

In the case that the printed page reaches the second set page, i.e. the last page which is page 100, the CPU 101 moves to the next processing. First, the video count value stored in the video count unit 112 is read (step S215). By comparing the video count value read in step S215 and the video count value read in step S206, the amount of consumed toner from the end of printing of the second set page up to the end of printing of the second set page can be computed. This computed value is handled as the image density up to the second set page. That is to say, as a parameter for image density confirmation with the processing hereafter, the computed value is held in a work area in RAM 103.

After computing the image density up to the second set page, the CPU 101 prompts calibration processing executing again. That is to say, the processing is performed for patch image output (step S216), reading the patch image density (step S217), sensor reading value density conversion (step S218), and conversion density value storing (step S219). Subsequently, using the converted density value stored in step S219, processing to compute the density correcting table (step S220) and set the density correcting table (step S221) is performed.

Note that the processing in steps S216 through S219 are the same as the processing in steps S207 through S212 described already, so the detailed description thereof will be omitted here.

With the calibration processing in steps S216 through S219, any density shift occurring from the printing up to the second set page can be prevented. That is to say, with the printer engine 30, density shift from the printing up to the second set page is corrected, and linear density is assured thereto.

The CPU 101 repeatedly performs the processing of steps S204 through S221 for the number of copies worth set beforehand (step S222). For example, in the case that the number of repeats: P is 2, i.e. in the case the number of copies to subject to calibration processing is 2, there are 2 of the measured density shift amount of the first set page and the measured density shift amount of the second set page for each patch image.

Figure 8:
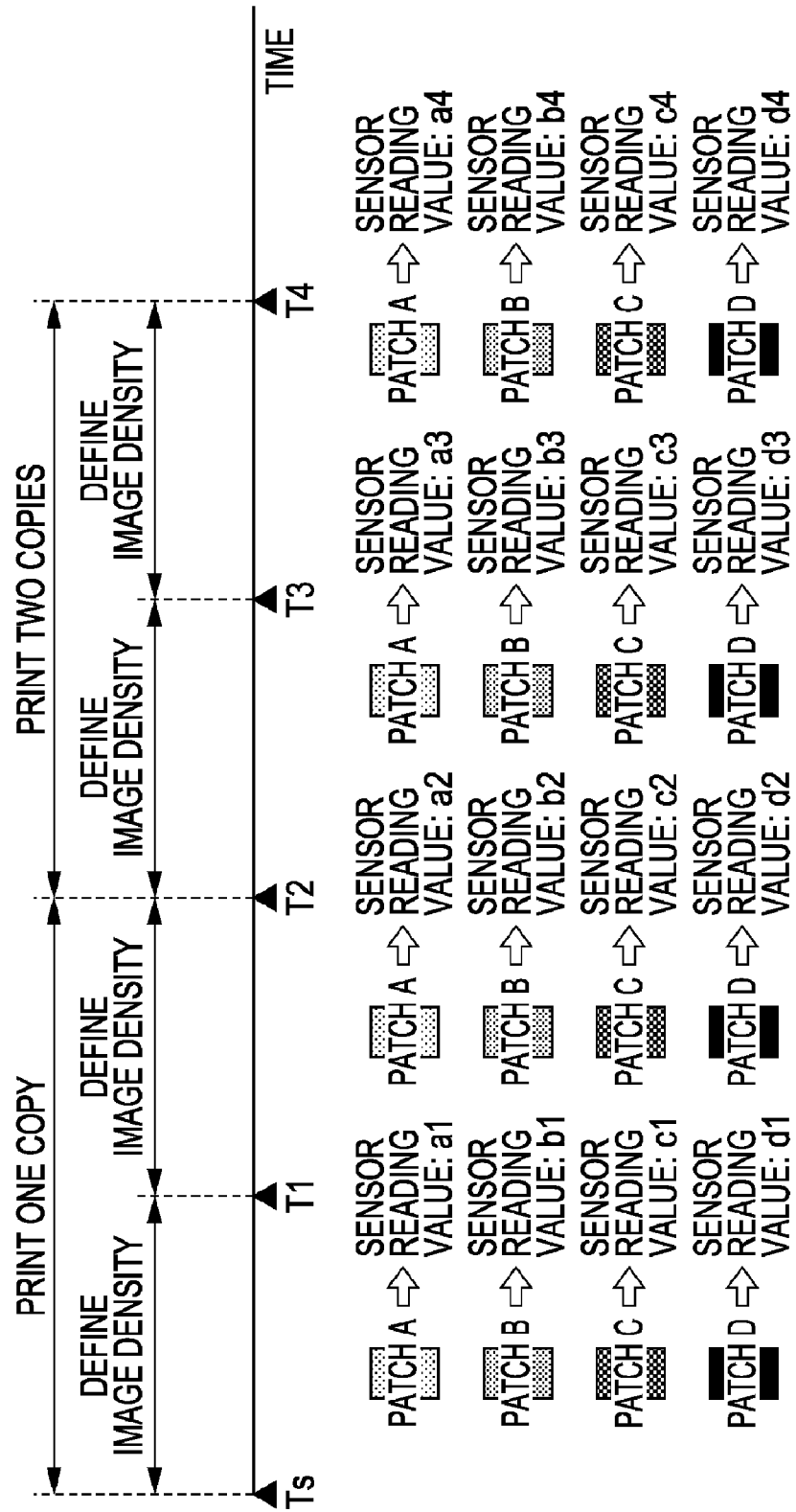
FIG. 8 is a diagram illustrating calibration executing timing according to the second embodiment.

Using another diagram, how to use each of the patch image density values read multiple times will be described. FIG. 8 shows the calibration operation timing in the case of taking the parameter of time as the horizontal axis, and the measured density value for each patch image at the time of performing calibration.

In FIG. 8, Ts denotes printing starting timing. T1, T2, T3, and T4 each denote calibration operating timing, wherein T1 and T3 denote calibration operations after printing the first set page has ended, and T2 and T4 denote calibration operations after printing the second set page has ended.

Also, the patch images A, B, C, and D shown in the various positions for T1 through T4 indicate the patch images used at the time of calibration operation, and with the present description, image A has density: 64, image B has density: 128, image C has density: 192, and image D has density: 255.

The a1, b1, c1, d1 shown beside each patch image at the T1 timing indicate the density values read by the density sensor 20 with the first set page and first calibration operation.

Also, a2, b2, c2, d2 show the density values read by the density sensor 20 with the first calibration operation. Hereafter, similarly, the a3, b3, c3, d3 shown beside each patch image at the T3 timing indicate the density values read by the first set page and second calibration operation. Also, the a4, b4, c4, d4 shown beside each patch image at the T4 timing indicate the density values read by the second set page and second calibration operation.

With the second embodiment, the timing for each calibration is after the printing up to a set page has ended. Accordingly, the definition of the image density in this case becomes the toner consumption amount (incremental amount of video count values) in the case that printing is performed up to the set page. The image data that is printed is the same if up to the set page is considered as a unit, so the image density after the printing up to the first set page or the image density after the printing up to the second set page becomes the same. Accordingly, the timing in T1 and T3 is after the same image data is printed for the same page worth, whereby the density shift amount from the printing becomes roughly similar. That is to say, a1 and a3, b1 and b3, c1 and c3, and d1 and d3 become similar values. Also, similarly, the timing of T2 and T4 is after printing of the same page worth for the same image data, whereby the density shift from this printing becomes roughly the same. That is to say, a2 and a4, b2 and b4, c2 and c4, and d2 and d4 become similar values.

Accordingly, using a1, b1, c1, d1, a2, b2, c2, d2, a3, b3, c3, d3, a4, b4, c4, d4, the density shift amount after the printing is ended for the number of copies thereafter is measured. For example, as shown in FIG. 8, in the case of measuring with the calibration operation results of 2 copies and 4 times, an average density measurement value for each time of the patch image data is used as the density shift amount after the printing is ended for the number of copies thereafter. Thus, measuring the density shift amount for the third copy and thereafter with the calibration processing becomes unnecessary. Also, the density correcting table can be corrected and set according to the measurement density shift amount.

That is to say, in step S222, upon the number-of-copies printing ending, the CPU 101 reads the converted density values measured over multiple times from the time of starting printing. The density correcting table is then computed based on the converted density value for each time. The converted density valued used at the time of computing the density correcting table may be arranged such that the converted density value corresponding to each time is subjected to averaging processing, or in the case that there is no variance in the converted density value for each time, the converted density value for the newest time may be used.

In step S222, upon the printing for the number of copies worth (two copies worth) subjected to calibration operation ending, the CPU 101 starts the printing for the next number of copies (step S223). The CPU 101 continues printing operation until the printing of the first set page has ended (step S224). In step S224, in the case determination is made that printing up to the first set page has ended, the CPU 101 reads the converted density value at the first set page stored in the RAM 103 (step S225). Taking the example shown in FIG. 8, with patch image A, the converted density values using a1 and a3 are read, with patch image B, b1 and b3, with patch image C, c1 and c3, and with patch image D, d1 and d3. Next, the CPU 101 computes the density correcting table with consideration for the density shift after printing of the first set page (step S226). The computed density correcting table is then set as to the density correcting table 108 (step S227).

The density correcting table set in the density correcting table 108 is computed using the density shift amount after the first set page printing has ended, whereby at the time of the printing thereafter, linear density is assured.

Next, the CPU 101 controls the printing up to the second set page. Execution of the printing is performed until the printing up to the second set page is ended (steps S228, S229). In step S229, in the case that determination is made that printing up to the second set page has ended, the CPU 101 reads the converted density value at the second set page stored in the RAM 103 (step S230). Taking the example shown in FIG. 8, with patch image A, the converted density values using a2 and a4 are read, with patch image B, b2 and b4, with patch image C, c2 and c4, and with patch image D, d2 and d4. Next, the CPU 101 computes the density correcting table with consideration for the density shift after printing of the second set page (step S231). The computed density correcting table is then set as to the density correcting table 108 (step S232).

The density correcting table set in the density correcting table 108 is computed using the density shift amount after the second set page printing has ended, whereby at the time of the printing thereafter, linear density is assured.

The CPU 101 performs printing while repeatedly performing the processing of steps S223 through S232 until all of the input jobs have been completed, i.e. until all of the printing is completed. That is to say, the CPU 101 performs control using the end of the printing up to the first set page or the end of the printing up to the second set page as the set timing of the density correcting table. Also, with the set timing for the density correcting table, the density correcting table is created based on the density values measured and converted at the time of printing starting, whereby calibration processing is not necessarily performed.

Figure 9:
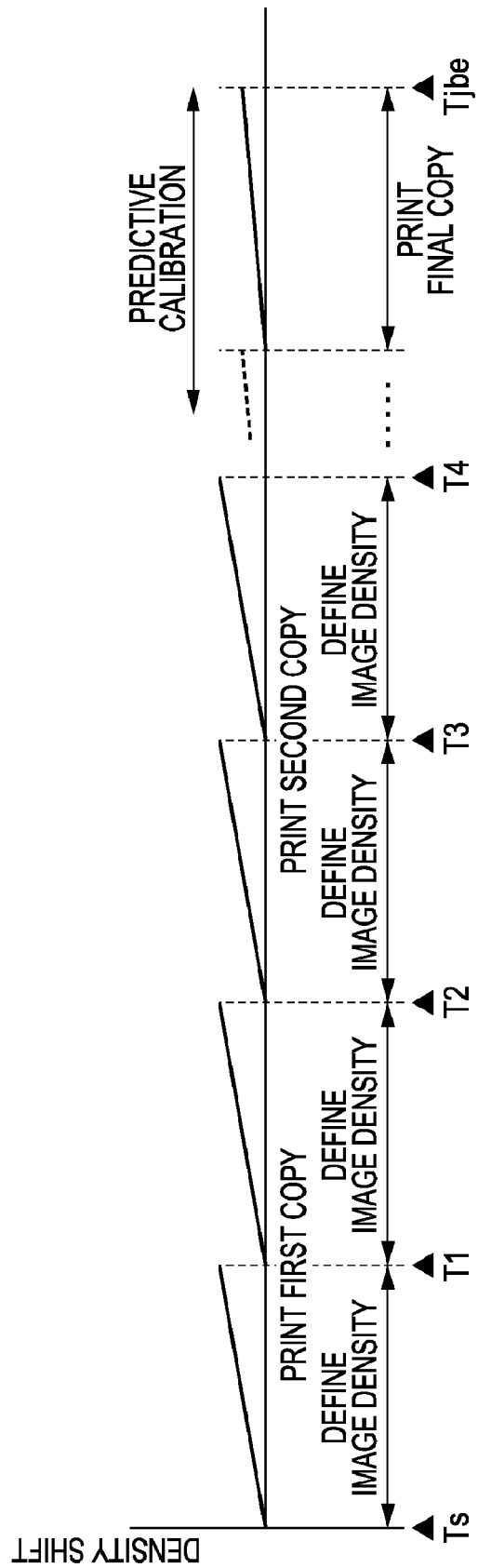
FIG. 9 is a schematic diagram of the configuration for printing a number of copies according to the second embodiment.

An operation schematic diagram according to the second embodiment is shown in FIG. 9. FIG. 9 is a diagram showing time for the horizontal axis and density shift amount for the vertical axis. In FIG. 9, Ts denotes printing starting timing, and T1, T2, T3, and T4 denote the end of printing the first set page making up the image data to be printed, or the timing for the end of printing the second set page. Also, Tjbe denotes timing that the printing of the input job is completed.

At the time of printing the first P copies to be printed, calibration is performed at the time of printing up to the first set page or at the time of completing printing of the second set page. Accordingly, as with the present description, if P is 2, then calibration processing is performed only at the timings of T1, T2, T3, and T4. Using the density shift amount for each patch according to calibration operations at the timings of T1, T2, T3, and T4, the density correcting table for the printing thereafter is computed and set. Accordingly, at the time of printing at the third copy and thereafter, calibration operation is not performed, and density correcting processing is performed with the density correcting table based on predicted density shift.

Also, using the density shift amount at the time of printing for the second set page being completed, the density correcting table at the printing thereafter is computed and set. Therefore, in the case of performing printing of the first set page or second set page in the number of copies thereafter, printing can be performed without largely fluctuating the density shift amount.

Thus, productivity can be improved because printing can be performed without the printing being interrupted. Also, even if calibration processing is not performed, the density shift amounts with consideration for image ratio by printing execution up to the first set page and second set page are compared, and setting of the density correcting table is performed, printing output image quality can be improved.

As described above, according to the second embodiment, in the case that the printing configuration is number-of-copies printing configuration, and further that the number of pages making up one copy is a large number, segmenting the pages into multiples is set as the density correcting table timing. That is to say, the page configuration making up one copy as the image density with the highest accuracy for density correcting is segmented. With the number-of-copies printing configuration, a large number of pages are not handled together, but rather are handled in multiple segments, whereby image density setting can be performed more accurately, and precision by the density correcting processing in the case of not performing calibration operation is improved.

Third Embodiment

Next, a third embodiment will be described. With the first embodiment and second embodiment, calibration operations are performed at predetermined timings within the limited number of copies according to the printing configuration, from the point-in-time that the job for printing execution is input. In other words, the density correcting table is set by measuring the density shift amount and holding the measured value for each case according to the image density defined with each printing configuration.

Conversely, with the third embodiment, a test print mode is provided, and within the mode operation thereof, the density shift amount is measured and held in the stage before printing a large amount of copies, according to the provided printing configuration.

Before printing a large number of copies, printing a test print is often performed rather than depending on a POD device. With the execution of the test printing, in the case that determination is made that there is no problem with image data layout, and confirmation of colors and confirmation of typos have been performed, the printing for a large number of copies is performed.

An input printing execution job is required to have high productivity and high image quality at the time of printing a large number of copies. Accordingly, the calibration operation is not performed at the time of printing a large number of copies, but is performed at the time of executing the test printing.

Figure 10:
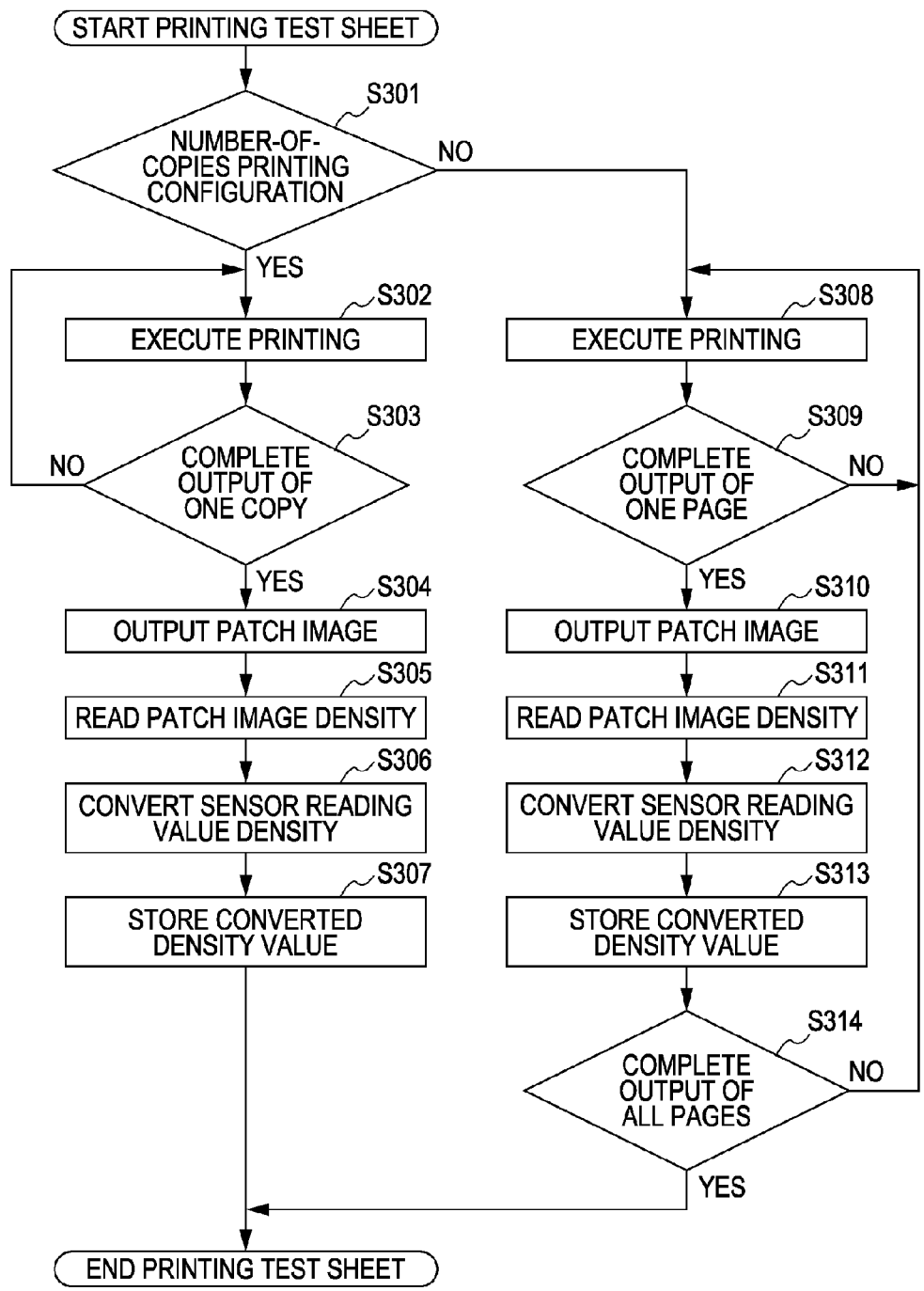
FIG. 10 is a diagram illustrating operational flow according to the third embodiment.
Figure 11A:
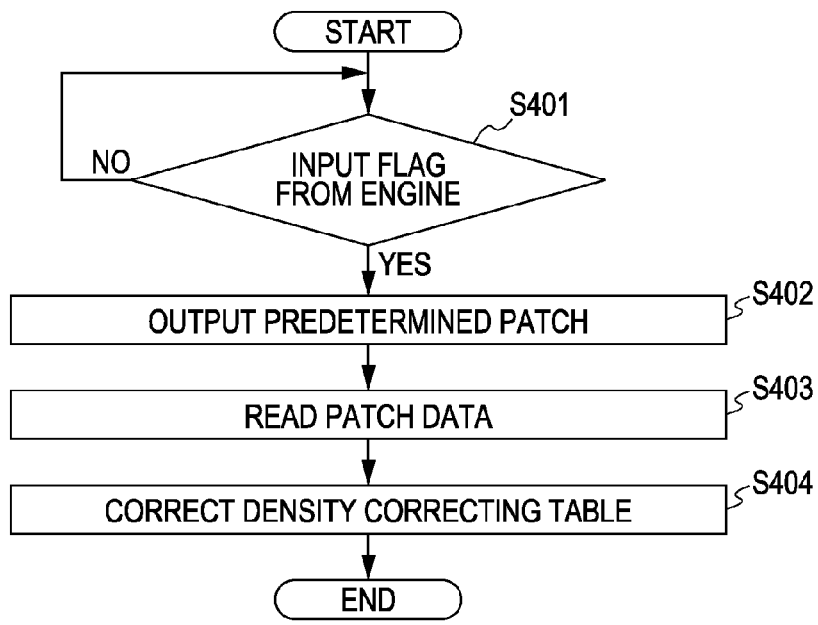
FIGS. 11A and 11B are diagrams illustrating calibration operation flow.
Figure 11B:
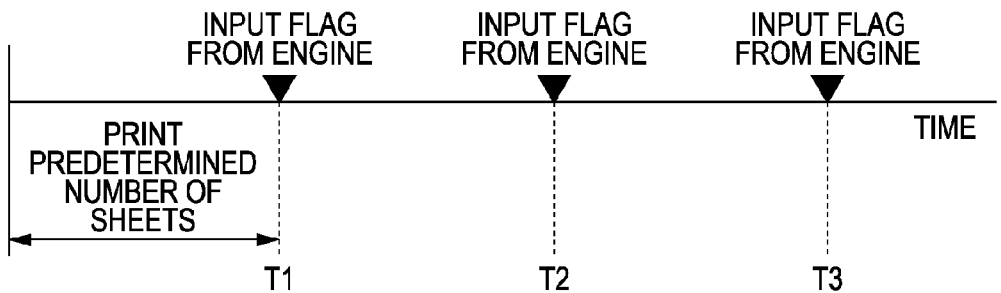

FIG. 10 shows an operational flow according to the third embodiment. Upon the test printing mode being selected, the CPU 101 performs confirmation of the printing configuration at the time of printing a large number of copies thereafter (step S301). In the case of printing a large number of copies with the number-of-copies printing configuration after the test printing, printing is performed with the calibration operation timing with number-of-copies printing (step S302). That is to say, from the first page to the last page is continuously printed (step S303).

As described with the first embodiment also, in the case of number-of-copies printing configuration, one copy equates to image density. Accordingly, the measurement of density shift by the calibration operation execution is at the point-in-time that printing for one copy is ended. Accordingly, with step S303, in the case determination is made that printing for one copy has been completed, calibration operation is performed in order to measure the density shift amount by printing execution of one copy. That is to say, the patch image is output (step S304), the patch image image-formed on the photosensitive drum is read with the density sensor 20 (step S305), and the reading value is converted to density value (density shift amount) (step S306). The CPU 101 stores the converted density value in the RAM 103 (step S307). In step S307, the density shift amount for each of the patches stored in the RAM 103 is used as a density correcting table computed density value at the time of printing a large number of copies after test printing. That is to say, at the time of printing a large number of copies, the calibration operation is not performed, and the density correcting table is rewritten at the timing according to printing configuration.

Also, an arrangement may be made wherein the density shift amount is measured at the time of executing test printing, and is compared to the density shift amount by the calibration operation after the first printing at the time of printing a large number of copies. In this case, the number of calibration operations performed at the time of printing a large number of copies can be reduced, whereby the productivity at time of printing a large number of copies can be improved.

Next, in step S301, in the case of printing a large number of copies with the page printing configuration after printing a test page, the image forming apparatus performs printing with the calibration operation timing as a premise thereof (step S308). That is to say, image data is output for each page (step S309), and the calibration operation is performed each time. That is to say, the patch image is output (step S310), the patch image image-formed on the photosensitive drum is read with the density sensor 20 (step S311), and the reading value converted to a density value (density shift amount) (step S312). The CPU 101 stores the converted density value in the RAM 103 (step S313).

With the page printing configuration, the calibration operation is after printing of each page, whereby the conversion density values in step S313 are each stored for each page worth. Note that in step S307, the density shift amount for each patch which is stored in the RAM 103, is used as a density correcting table computing density value at the time of printing a large number of copies. That is to say, at the time of printing a large number of copies, the density correcting table can be rewritten with a timing according to the printing configuration as appropriate, instead of performing calibration operations.

Even with the page printing configuration, when printing a large number of copies, the calibration operation cannot be performed, whereby productivity can be improved. Also, at the time of printing a large number of copies, the density correcting table is set using the density shift amount after printing each page measured at the time of the test printing operation mode, whereby the image quality to be printed can be improved.

As described above, according to the third embodiment, the test print mode is provided, and at the time of executing the test print mode, the calibration operation is performed according to the various printing configurations, and performs measurement of the density shift amount. The density shift amounts by the calibration operation at the time of the test print mode is compared to the time of printing a large number of copies thereafter, or used, whereby productivity is improved. Also, in this case as well, the calibration operation is not performed, but rather the density correcting table is rewritten using the measured density shift amount as appropriate, so the density correcting table is rewritten whereby high image quality can be achieved.

Other Embodiments

Note that the present invention may be may be applied to a system made up of multiple devices (e.g. host computer, interface device, reader, printer, etc), or may be applied to an apparatus made up of one device (e.g. photocopier, facsimile, etc).

Also, a recording medium wherein the program code of the software to realize the functions of the above-described embodiments are recorded is supplied to the system or apparatus, and the computer (CPU or MPU) of the system or apparatus thereof reads and executes the program code stored in the recording medium.

In this case, the program code itself read from the computer-readable recording medium realizes the functions of the above-described embodiments, and the recording medium storing such program code makes up the present invention.

As a recording medium to supply the program code, for example a floppy disk, hard disk, optical disk, optical magnetic disk, CD-ROM, CD-R, magnetic tape, non-volatile memory card, ROM, and so forth may be used.

Also, not only are the functions of the above-described embodiments realized by executing the program code read out by the computer, but, based on the program code instructions, the OS (operating system) operating on the computer performs a portion or all of the actual processing, and the functions of the above-described embodiments are realized by the processing thereof.

Further, the program code read out from the recording medium is written into a function expansion board inserted into the computer, or memory attached to a function expansion unit connected to the computer. It goes without saying that the CPU or the like connected to the function expansion board or function expansion unit performs a portion or all of the actual processing, based on instructions from the program code, and the functions of the above-described embodiments are realized by the processing thereof.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-33963 filed Dec. 21, 2007, which is hereby incorporated by reference herein in its entirety.

What is claimed is:

1. An image processing apparatus that prints image data including a plurality of pages one copy at a time, and prints a plurality of copies, the image processing apparatus comprising:
a generating unit that generates a patch image having a plurality of densities;
a forming unit that forms the patch image on a photosensitive drum; and
a reading unit that reads a density of the patch image,
wherein the generating unit, forming unit, and reading unit execute processing at a time of ending printing for an N'th copy and at a time of ending printing for an (N+K)'th copy, where N is an integer and K is a natural number,
the image processing apparatus further comprising:
a density shift amount computing unit that computes a density shift amount for a set number of copies between a first density reading value of the patch image at the time of ending printing for the N'th copy and a second density reading value of the patch image at the time of ending printing for the (N+K)'th copy;
a table computing unit that computes, based on the computed density shift amount for the set number of copies, a density correcting table to correct a density shift from a standard density for a set number of copies after the printing for the (N+K)'th copy is completed; and
a density shift correcting unit that corrects the density shift from the standard density for a set number of copies after an (N+K+1)'th copy using the density correcting table computed by the table computing unit.

2. The image processing apparatus according to claim 1, wherein, when a number of pages making up one copy is greater than a predetermined number of pages,
the number of pages making up the one copy are segmented into a plurality of page groups,
the density shift amount is computed with a segmented page group as number of copies, and
using a density correcting table computed based on the density shift amount, the density shift for the set number of copies is corrected.

3. An image processing apparatus that consecutively prints a plurality of copies of a same page, and prints a plurality of pages, the image processing apparatus comprising:
a generating unit that generates a patch image having a plurality of densities;
a forming unit that forms the patch image on a photosensitive drum; and
a reading unit that reads a density of the patch image,
wherein the generating unit, forming unit, and reading unit execute processing at a time of ending printing for a same page of an N'th copy and at a time of ending printing for an (N+K)'th copy, where N is an integer and K is a natural number,
the image processing apparatus further comprising:
a density shift amount computing unit that computes a density shift amount for a set number of copies between a first density reading value of the patch image at the time of ending printing for the N'th copy and a second density reading value of the patch image at the time of ending printing for the (N+K)'th copy;
a table computing unit that computes, based on the computed density shift amount for the set number of copies, a density correcting table to correct a density shift from a standard density for a set number of copies after the printing for the (N+K)'th copy is completed; and
a density shift correcting unit that corrects the density shift from the standard density for a set number of copies after an (N+K+1)'th copy using the density correcting table computed by the table computing unit.

4. A method for printing image data that includes a plurality of pages, one copy at a time, and for printing a plurality of copies, the method comprising:
generating a patch image having a plurality of densities;
forming the patch image on a photosensitive drum; and
reading a density of the patch image,
wherein generating the patch image, forming the patch image, and reading the density of the patch image are performed at a time of ending printing for an N'th copy and at a time of ending printing for an (N+K)'th copy, where N is an integer and K is a natural number,
the method further comprising:
computing a density shift amount for a set number of copies between a first density reading value of the patch image at the time of ending printing for the N'th copy and a second density reading value of the patch image at the time of ending printing for the (N+K)'th copy;
computing, based on the computed density shift amount for the set number of copies, a density correcting table to correct the density shift from a standard density for a set number of copies after the printing for the (N+K)'th copy is completed; and correcting the density shift from the standard density for a set number of copies after an (N+K+1)'th copy using the computed density correcting table.

5. A method to consecutively print a plurality of copies of a same page, and to print a plurality of pages, the method comprising:

generating a patch image having a plurality of densities;

forming the patch image on a photosensitive drum; and reading a density of the patch image, wherein generating the patch image, forming the patch image, and reading the patch image are performed at a time of ending printing for the same page of an N'th copy and at a time of ending printing for an (N+K)'th copy, where N is an integer and K is a natural number, the method further comprising:

computing a density shift amount for a set number of copies between a first density reading value of the patch image at the time of ending printing for the N'th copy and a second density reading value of the patch image at the time of ending printing for the (N+K)'th copy;

computing, based on the computed density shift amount for the set number of copies, a density correcting table to correct the density shift from a standard density for a set number of copies after the printing for the (N+K)'th copy is completed; and correcting the density shift from the standard density for a set number of copies after an (N+K+1)'th copy using the computed density correcting table.

6. A non-transitory computer-readable storage medium storing a control program to cause a computer to execute a method for an image processing apparatus that prints image data including a plurality of pages one copy at a time, and prints a plurality of copies, the control program comprising:

generating a patch image having a plurality of densities;

forming the patch image on a photosensitive drum; and reading a density of the patch image, wherein generating the patch image, forming the patch image, and reading the patch image are performed at a time of ending printing for an N'th copy and at a time of ending printing for an (N+K)'th copy, where N is an integer and K is a natural number, the control program further comprising:

computing a density shift amount for a set number of copies between a first density reading value of the patch image at the time of ending printing for the N'th copy and a second density reading value of the patch image at the time of ending printing for the (N+K)'th copy;

computing, based on the computed density shift amount for the set number of copies, a density correcting table to correct the density shift from a standard density for a set number of copies after the printing for the (N+K)'th copy is completed; and correcting the density shift from the standard density for a set number of copies after an (N+K+1)'th copy using the computed density correcting table.

7. A non-transitory computer-readable storage medium storing a control program to cause a computer to execute a method for an image processing apparatus that prints image data including a plurality of pages one copy at a time, and prints a plurality of copies, the control program comprising:

generating a patch image having a plurality of densities;

forming the patch image on a photosensitive drum; and reading a density of the patch image, wherein generating the patch image, forming the patch image, and reading the patch image are performed at a time of ending printing for an N'th copy and at a time of ending printing for an (N+K)'th copy, where N is an integer and K is a natural number, the control program further comprising:

computing a density shift amount for a set number of copies between a first density reading value of the patch image at the time of ending printing for the N'th copy and a second density reading value of the patch image at the time of ending printing for the (N+K)'th copy;

computing, based on the computed density shift amount for the set number of copies, a density correcting table to correct the density shift from a standard density for a set number of copies after the printing for the (N+K)'th copy is completed; and correcting the density shift from the standard density for a set number of copies after an (N+K+1)'th copy using the computed density correcting table.

* * * * *